331-98

CROSS REFERENCE SEARCH ROOM

April 9, 1968 A. J. STECCA ET AL 3,377,564

MICROWAVE OSCILLATOR FOR ELECTRONIC OVEN

Original Filed Feb. 3, 1964 13 Sheets-Sheet 1

INVENTORS
ANTHONY J. STECCA,
LOUIS A. BARNAS,
SOPHOCLES J. DOKOS
WILLIAM B. JARZEMBSKI
AND PAUL C. NORRIS
BY George R. Clark ATT'Y.

INVENTORS
ANTHONY J. STECCA,
LOUIS A. BARNAS,
SOPHOCLES J. DOKOS,
WILLIAM B. JARZEMBSKI
AND PAUL C. NORRIS
BY George R. Clark ATT'Y.

MICROWAVE OSCILLATOR FOR ELECTRONIC OVEN

INVENTORS
ANTHONY J. STECCA,
LOUIS A. BARNAS,
SOPHOCLES J. DOKOS,
WILLIAM B. JARZEMBSKI
AND PAUL C. NORRIS
BY George R. Clark ATT'Y.

April 9, 1968 A. J. STECCA ET AL 3,377,564

MICROWAVE OSCILLATOR FOR ELECTRONIC OVEN

Original Filed Feb. 3, 1964 13 Sheets-Sheet 4

INVENTORS
ANTHONY J. STECCA,
LOUIS A. BARNAS,
SOPHOCLES J. DOKOS
WILLIAM B. JARZEMBSKI
AND PAUL C. NORRIS
BY George R. Clark ATT'Y.

MICROWAVE OSCILLATOR FOR ELECTRONIC OVEN

Original Filed Feb. 5, 1964 13 Sheets-Sheet 5

INVENTORS
ANTHONY J. STECCA,
LOUIS A. BARNAS,
SOPHOCLES J. DOKOS,
WILLIAM B. JARZEMBSKI
AND PAUL C. NORRIS
BY George R. Clark ATT'Y.

MICROWAVE OSCILLATOR FOR ELECTRONIC OVEN

INVENTORS
ANTHONY J. STECCA,
LOUIS A. BARNAS,
SOPHOCLES J. DOKOS,
WILLIAM B. JARZEMBSKI
AND PAUL C. NORRIS
BY George R. Clark ATT'Y.

MICROWAVE OSCILLATOR FOR ELECTRONIC OVEN

Original Filed Feb. 3, 1964 13 Sheets-Sheet 7

INVENTORS

ANTHONY J. STECCA,
LOUIS A. BARNAS,
SOPHOCLES J. DOKOS,
WILLIAM B. JARZEMBSKI
AND PAUL C. NORRIS
BY George R. Clark ATT'Y.

INVENTORS
ANTHONY J. STECCA,
LOUIS A. BARNAS,
SOPHOCLES J. DOKOS,
WILLIAM B. JARZEMBSKI
AND PAUL C. NORRIS
BY George R. Clark ATT'Y.

MICROWAVE OSCILLATOR FOR ELECTRONIC OVEN

Original Filed Feb. 3, 1964 13 Sheets-Sheet 9

INVENTORS
ANTHONY J. STECCA,
LOUIS A. BARNAS,
SOPHOCLES J. DOKOS,
WILLIAM B. JARZEMBSKI
AND PAUL C. NORRIS
BY George R. Clark ATT'Y.

INVENTORS
ANTHONY J. STECCA,
LOUIS A. BARNAS,
SOPHOCLES J. DOKOS,
WILLIAM B. JARZEMBSKI
AND PAUL C. NORRIS
BY George R. Clark ATT'Y.

INVENTORS.
ANTHONY J. STECCA,
LOUIS A. BARNAS,
SOPHOCLES J. DOKOS,
WILLIAM B. JARZEMBSKI
AND PAUL C. NORRIS
BY George R. Clark ATT'Y.

MICROWAVE OSCILLATOR FOR ELECTRONIC OVEN

INVENTORS
ANTHONY J. STECCA,
LOUIS A. BARNAS,
SOPHOCLES J. DOKOS,
WILLIAM B JARZEMBSKI
AND PAUL C. NORRIS
BY George R. Clark ATT'Y.

INVENTORS
ANTHONY J. STECCA,
LOUIS A. BARNAS,
SOPHOCLES J. DOKOS,
WILLIAM B. JARZEMBSKI
AND PAUL C. NORRIS
BY George R. Clark ATT'Y.

United States Patent Office 3,377,564

Patented Apr. 9, 1968

3,377,564
MICROWAVE OSCILLATOR FOR ELECTRONIC OVEN

Anthony J. Stecca, Wheaton, Louis A. Barnas, Cary, Sophocles J. Dokos, Chicago, and William B. Jarzembski, Riverside, Ill., and Paul C. Norris, Temple City, Calif., assignors to Sunbeam Corporation, Chicago, Ill., a corporation of Illinois Original application Feb. 3, 1964, Ser. No. 342,199. Divided and this application Jan. 3, 1967, Ser. No. 606,825

7 Claims. (Cl. 331—70)

ABSTRACT OF THE DISCLOSURE

An electronic oven of small size powered by a vacuum tube microwave oscillator. The oven includes automatically adjustable tuning and coupling mechanisms which maintain proper power transfer for differing loads. The oscillator is a grounded cathode amplifier with a tuned cavity and utilizes a tuned transmission line to couple the grid to the anode cavity. Oscillator cooling is accomplished by forcing air past the vacuum tube and the vacuum tube anode cooling fins.

The present application is a division of copending Anthony J. Stecca et al. application Ser. No. 342,199, filed February 3, 1964, now United States Patent No. 3,321,604. It relates to a heating apparatus and, more particularly, to an oven or heating construction useful in home, commercial, or industrial kitchens.

Attempts have been made in the past to reduce the time required to cook food and other articles by using dielectric or induction heating techniques. In certain of the prior devices, the oven is constructed as a cavity several wavelengths in height which is supplied with energy in the range between 900 and 2500 megacycles. These ovens have not attained wide acceptance and usage because the size of the oven and the frequency used permit the formation of standing waves in the oven cavity which cause alternate hot and cold spots in the article to be cooked. With some articles, only surface heating occurs, and certain types of food such as frozen foods cannot be successfully heated at all. Attempts have been made to avoid uneven heating in this type of cavity by employing "stirrers" or plural radiating and reflecting surfaces to disperse or direct the standing waves. These added components increase the size and cost of the heating construction and are inefficient in their utilization of the supplied energy.

The prior units have generally used one of two different techniques or systems for transferring high frequency energy from a source or generator to the article to be heated. In one system commonly used for industrial heating, the article to be heated or, for instance, dried, is disposed between a pair of coextensive electrodes in a chamber, and the combined chamber, electrode, and article form the plate load for an oscillator used as a power source. In these systems, the operating frequency of the oscillator changes with the change in plate loading, and the design of the oscillator must be such that it is capable of delivering adequate power throughout the entire frequency range over which the oscillator can be tuned by the load. This places an inherent limitation on this type of system because either it is necessary to limit the articles with which the heating apparatus is used to ones that cause only a slight shift or drift in the oscillator operating frequency or it is necessary to provide expensive and somewhat sensitive oscillator constructions.

Another type of system used more frequently in home and institutional oven constructions is one in which the oscillator operates at a fixed frequency and is coupled to an oven or heating chamber forming a cavity resonant at the fixed frequency of the oscillator. When an article to be heated or a load is introduced into the cavity, the resonant frequency of the cavity changes with the result that the cavity is no longer matched to the oscillator. This mismatched impedance reduces the efficiency of the oscillator and permits the transfer of only a portion of the oscillator output energy to the oven cavity while introducing a large amount of back power. Thus, varying amounts of energy in the form of heat are transferred to the article to be heated in dependence on, for instance, the size of the article, its temperature, and its composition. In an attempt to compensate for these deficiencies, the back power from the cavity is frequently monitored and used to adjust a variable timer that lengthens or shortens the cooking interval in dependence on the efficiency with which the energy transfer operation is taking place. However, this system is wasteful of power and loses some of the advantages of reduced cooking time possessed by radio frequency cooking.

Accordingly, one object is to provide a new and improved heating apparatus or system.

Another object is to provide an oven or heating construction of the type using radio frequency energy in which energy is efficiently transferred to many different kinds of foods.

Another object is to provide a heating apparatus for obtaining uniform heating of foods of different sizes, conditions, and compositions.

Another object is to provide a radio frequency oven construction that is easily and economically constructed.

A further object is to provide radio frequency heating construction that is substantially free from spurious radiation.

Another object is to provide a radio frequency oven including a new and improved oscillator.

Another object is to provide an easily and economically constructed coaxial oscillator.

A further object is to provide a radio frequency oven using a fixed frequency energy source in which the oven cavity is automatically tuned to the fixed frequency of the source regardless of the load introduced into the oven cavity.

Another object is to provide a radio frequency oven using a fixed frequency energy source in which the coupling to the oven cavity is automatically adjusted in accordance with the load introduced into the oven cavity.

Another object is to provide a servo system for automatically tuning and changing the coupling to the resonant cavity of an oven in accordance with the changes in the cavity occasioned by the introduction of an article to be heated.

A further object is to provide a radio frequency oven including a new and improved oven cavity construction and shielding means therefor.

A further object is to provide a heating apparatus including new and improved means for varying the tuning of the resonant cavity.

A further object is to provide a novel reentrant resonant cavity structure including means for varying the tuning thereof.

A further object is to provide a radio frequency oven construction using a fixed frequency oscillator for supplying heating energy to an automatically tuned resonant cavity in combination with a circulator that diverts back power from the resonant cavity to a dummy or artificial load whenever the coupling and tuning of the oven cavity is not matched to the oscillator.

In accordance with these and many other objects, an embodiment of the present invention comprises an oven or heating construction using radio frequency heating means and conventional electrical resistance heating means in different combinations for performing all of the cooking operations normally performed in the home. The oven construction is capable of being used with articles varying in size from an egg to a twenty-pound turkey, foods varying widely in composition from baked goods to meat, and articles varying widely in initial temperature including completely frozen foods. These cooking, heating, or broiling operations are automatically performed by the heating construction and require a minimum amount of manual control adjustment by the operator. The oven construction is compact in size, easily and economically fabricated, and substantially free of spurious radio frequency radiation.

The heating construction includes an oven structure defining a resonant cavity that, with respect to the frequency of the supplied energy, is less than one wavelength in height and provides a resonant cavity normally tuned to the fixed frequency of the energy source. To compensate for the changing electrical characteristics of the oven cavity when the articles to be cooked or heated are introduced therein, the oven construction includes a reentrant portion or pedestal that is adjustable in height and width or cross-section as well as an adjustable inductive loop for varying the coupling between the cavity and the energy source. To prevent the radiation of radio frequency from the cavity, the article opening or oven door includes novel shielding means and means for sealing the cavity when the door is closed. A plural interlock controlled by a latch for the door insures the complete absence of radio frequency energy when the oven door is opened.

Since the cavity is less than a wavelength in height, the foods are uniformly heated and the presence of hot and cold spots in the heated food is avoided. Further, the provision of the adjustable coupling means and adjustable reentrant portion or pedestal, the resonant cavity forming the oven remains tuned to the fixed frequency of the energy source with the result that an efficient transfer of energy from the source to the article to be heated takes place. Since heating by radio frequency energy is not suitable for certain baked goods and does not produce surface browning, conventional resistance heating elements can be used either alone or in combination with the radio frequency heating in selected types of cooking operations.

The radio frequency energy source for supplying energy to the resonant oven cavity comprises a novel coaxial tetrode oscillator that can be economically and easily fabricated. In general, the oscillator comprises a resonant tank circuit cavity including two concentric cylinders coupled to the anode of a controlled conduction device or oscillator tube. A probe extending into the tank cavity is coupled to the grid of the tube by a tuned line to provide a feedback path. The grid tuned circuit is also enclosed in a conductive housing to insure that the oscillator is not a source of radio frequency radiation. An inductive loop coupled to the plate cavity provides means for withdrawing radio frequency energy which is coupled through two ports of a circulator and a coaxial cable to the coupling loop in the oven cavity. An additional or third port of the circulator is coupled to a dummy or artificial load matched in impedance to the impedance of the oscillator. Thus, the oscillator works into a matched impedance in even those instances in which the impedance of the oven cavity does not match that of the oscillator.

The oven construction includes two control systems for automatically tuning the cavity and the coupling to the oscillator. Thus, the oscillator works into a matched istic of the resonant oven cavity occasioned by the introduction of articles to be heated. In a first embodiment, a detecting and control network responsive to the waveforms of reflected energy from the cavity provides signals representing presence and direction of the unbalance which are supplied to separate servomotors for the pedestal and coupling loop so that these components are adjusted to match the cavity to the oscillator. In a second embodiment, a single drive motor for varying the relative positions of the pedestal and the coupling means in a random fashion is provided. This motor is controlled by a control network which is responsive to the amount of back power supplied to the dummy load and which is placed in operation when the back power exceeds a given level, indicating a mismatch between the impedance of the cavity and that of the oscillator. The drive motor varies the coupling and the pedestal position in a random fashion until the back power is reduced to a predetermined level indicating a suitable match between the cavity and the oscillator. At this time, the motor is dynamically braked to maintain the selected condition of the cavity.

Many other objects and advantages of the present invention will become apparent from considering the following detailed description in conjunction with the drawings, in which:

FIG. 22 is an enlarged sectional view taken along line 22—22 in FIG. 11.

Figures 1, 2, 10:
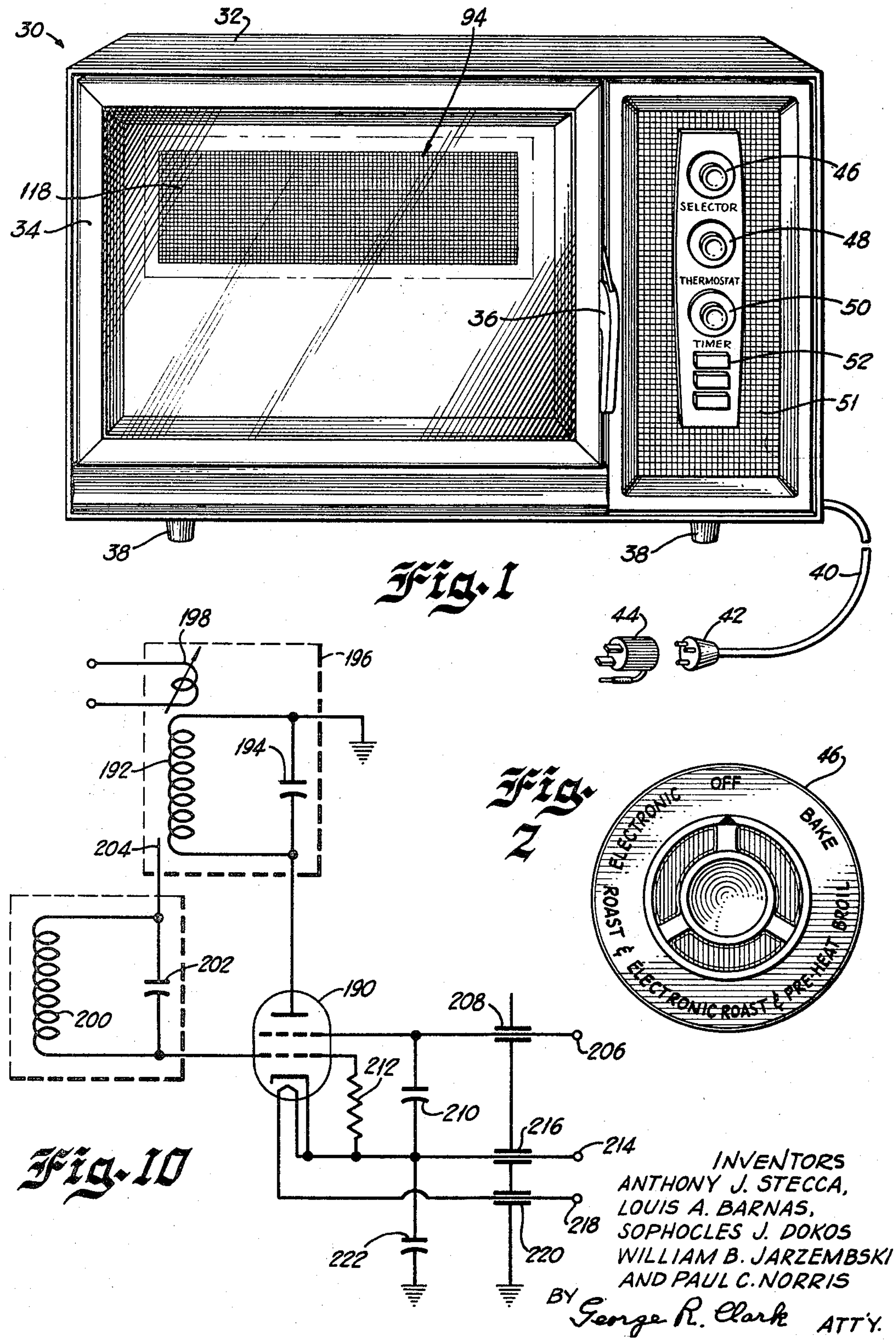
FIG. 1 is a front elevational view of a heating or oven construction embodying the present invention.
FIG. 2 is a schematic diagram of a selector knob used in the oven shown in FIG. 1.
FIG. 10 is a schematic circuit diagram of an oscillator used as an energy source for the oven construction.
Figure 3:
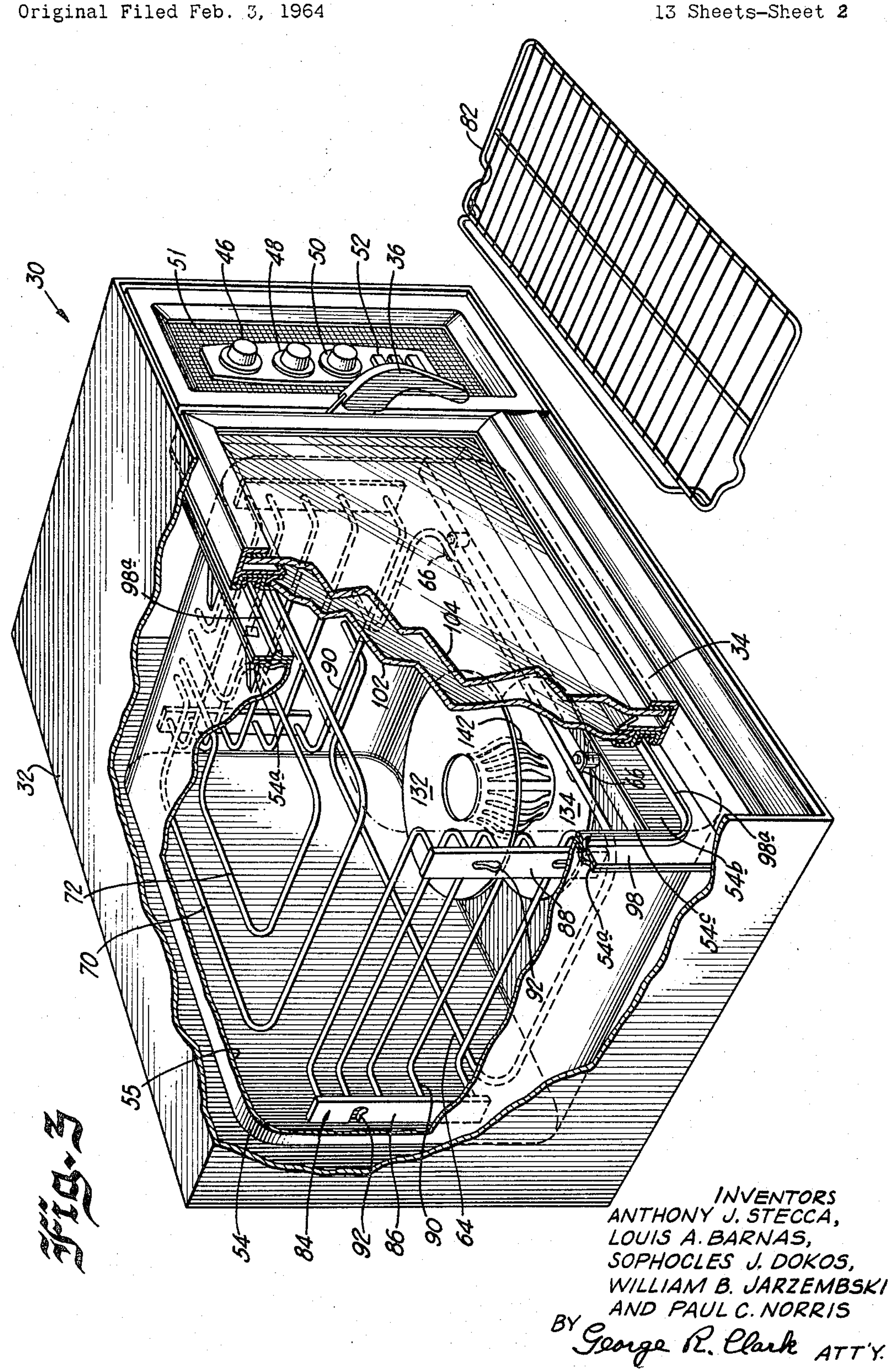
FIG. 3 is a perspective view in partial section illustrating the oven construction.

Referring now more specifically to FIGS. 1 and 3 of the drawings, therein is illustrated a heating apparatus or oven construction which embodies the present invention and which is indicated generally as 30. The oven construction 30 includes an outer housing or supporting frame 32, the interior of which is generally divided into a right-hand portion containing the controls and power supply and a left-hand portion containing an oven cavity closed by a pivotally mounted door 34 secured by a latch 36 that also controls a radio frequency energy interlock. The oven construction 30 can be formed either as a wall unit or can be provided with a plurality of feet 38 (FIG. 1) to rest on a supporting frame or counter. The oven 30 can be energized from a conventional 120 or 220-volt, 60-cycle potential source over a line cord 40 provided with a three terminal or grounded plug 42. This plug is adapted for two aperture female sockets by an adapter 44.

The oven portion of the construction 30 includes both conventional electrical heating means and radio frequency heating means to permit the heating apparatus 30 to be used in all of the cooking operations normally encountered in the home or in institutional food preparations. The electric and radio frequency heating means are individually or jointly rendered effective under the control of a selecting mechanism actuated by a selector knob 46 in the control section of the oven construction 30. By means of the selector 46 conventional electric heating only is used in such operations as baking which are not efficiently performed by the use of radio frequency heating. In other operations such as roasting meat, the radio frequency heating which quickly and completely heats the interior of a large roast, for example, is used in combination with conventional electric heating that is used to brown the outer surface of the roast. In other operations, the radio frequency heating is used alone to, for instance, defrost and heat vegetables disposed in their original sealed paper containers. Although any of the pans or receptacles normally used in cooking can be used when only the electric heating means are used, it is necessary to use dielectric containers for radio frequency cooking. These can include glass and ceramic ovenware and, at low temperatures, paper containers.

Figures 11, 11A, 12:
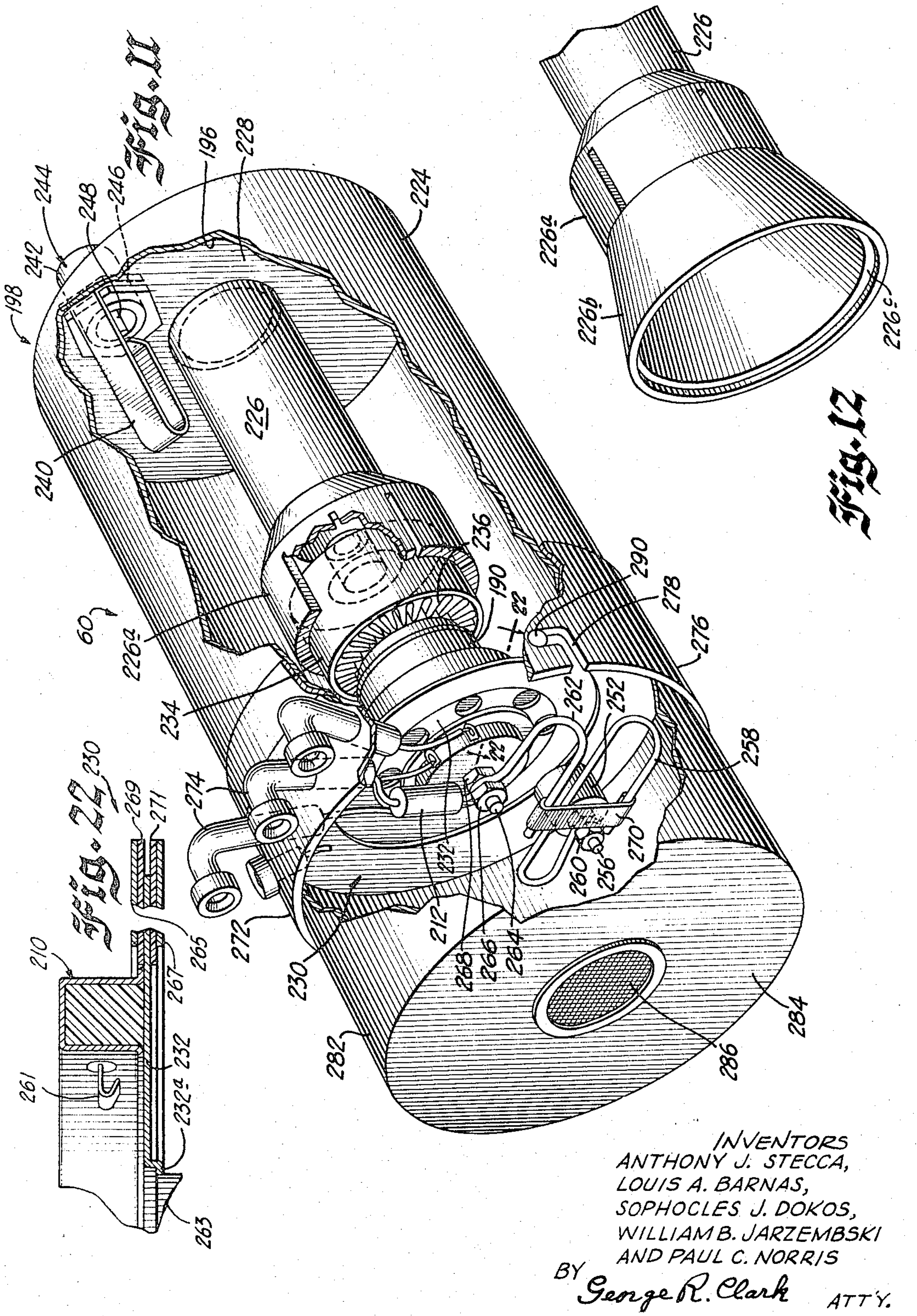
FIG. 11 is a perspective view in partial section of the mechanical construction of the oscillator shown in FIG. 10.
FIG. 12 is an enlarged fragmentary perspective view of a portion of the oscillator construction shown in FIG. 11.
Figure 13:
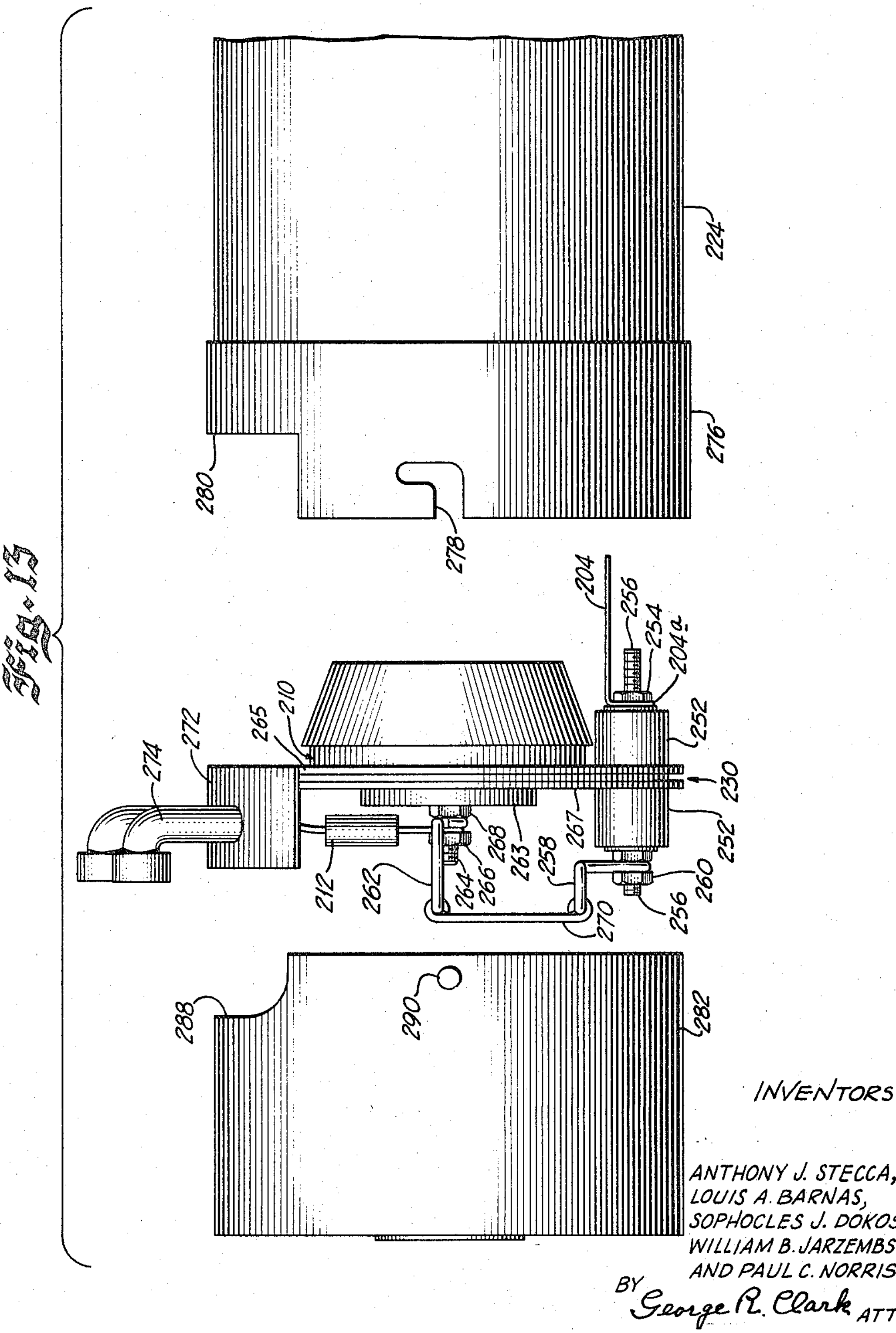
FIG. 13 is an exploded view in side elevation illustrating a grid-plate coupling circuit included in the oscillator shown in FIG. 11.

The control section of the oven construction 30 further includes a mechanism controlled by a knob 48 for adjusting the temperature at which the cooking operations are performed within the oven, and a mechanism controlled by a knob 50 for adjusting the duration of the heating operation or for providing an audible indication at the end of a selected time interval. The control section includes a plurality of additional combined switch and indicating means 52 that perform the various miscellaneous control functions commonly associated with oven constructions. These controls can be mounted on an island in a grillwork 51 providing an inlet and an outlet for air used to cool the control components of the oven 30. In its general construction, the heating apparatus 30 includes an electrically conductive oven liner or member 54 (FIG. 3) having a polished inner surface defining a resonant cavity 55. The cavity 55 contains conventional electric heating elements as well as a pedestal or tuning assembly indicated generally as 56 (FIGS. 4–6) for tuning the cavity 55 and a coupling assembly indicated generally as 58 for coupling radio frequency energy to the cavity from a fixed frequency oscillator 60 (FIGS. 11, 14, and 19) operating, for example, at 285 megacycles, or in a range between 200 and 425 megacycles. The resonant frequency of the cavity 55 is normally that of the oscillator 60 but is changed to a varying degree by the introduction of food into the oven 30. This results in a mismatched impedance between the oscillator 60 and the oven cavity 55 with the result that the efficiency of transfer of energy to food to be cooked is reduced. Accordingly, the oven construction 30 includes the automatically adjustable tuning assembly 56 and coupling assembly 58 to return the resonant cavity 55 to the frequency of the oscillator 60 so that a maximum power transfer occurs without requiring any adjustment in the operating frequency of the oscillator 60. Although this insures a maximum transfer of energy from the source or oscillator 60 to the food, it does not insure the absence of hot and cold spots therein or mere superficial or surface heating of the article. To accomplish this, the height of the cavity 55 is made less than one wavelength of the frequency supplied by the oscillator 60 to avoid standing waves and the problems introduced thereby.

Referring now more specifically to the oven portion of the heating apparatus 30 shown in FIGS. 3–9, the member 54 forming the resonant cavity 55 preferably is formed of metal, such as stainless steel, that is highly polished on its inner surfaces. The dimensions of the member 54 are such that the natural resonant frequency of the cavity 55 is substantially equal to the operating frequency of the oscillator 60. The interior of the cavity 55 is divided into an upper portion for receiving foods to be cooked and a lower portion containing the coupling assembly 58 and the tuning assembly 56 (FIGS. 4–6) by a dielectric or ceramic bottom or wall 62 (FIG. 5) that rests on a suitable supporting shelf or rack (not shown). The dielectric shelf 62 provides a capacitance that affects the tuning of the oven cavity 55 and should have as low a loss as possible so that the high Q of the cavity is not adversely affected. The shelf 62, which should also have proper thermal expansion characteristics and strength over the temperature range encountered, is positioned as close to the tuning assembly 56 as possible to avoid any undue reduction in the volume of the oven.

The height of the cavity 55 between the upper wall of the member 54 and the upper surface of the assembly 56 is substantially less than one wavelength of a signal of the frequency delivered by the oscillator 60 and preferably is on the order of one quarter of a wavelength. Since this portion of the resonant cavity 55 is less than one half of a wavelength in height and is the area for receiving the foods to be cooked, standing waves are not developed which result in hot and cold spots in the food. This is true even if the food is rather large and occupies substantially the full space between the top and bottom of the cooking area.

To provide means for electrically heating the interior of the resonant cavity 55, electric heating means are provided adjacent the upper wall of the member 54 and adjacent the dielectric lower wall 62. The lower heating means comprises a generally rectangular arrangement 64 (FIGS. 3–6) of conventional sheathed resistance heating element having two ends passing through one side wall of the member 54 to be connected to controlling switch means. The heating element 64 is engaged by conductive brackets 66 secured to the wall of the member 54 by screws or other suitable fasteners 68. The brackets 66 provide both means for supporting the heating element 64 and means for grounding the electrically conductive sheath of the element at points spaced less than a wavelength apart. By grounding the heating element 64 at a plurality of spaced points less than a quarter wavelength apart, the absorption of radio frequency energy in the cavity 55 by the heating element 64 is avoided.

The electric heating means adjacent the upper wall of the cavity defining member 54 comprises two generally rectangular arrangements 70 and 72 (FIGS. 7 and 8) of conventional sheathed resistance heating element which are secured to and supported from a plate 74 (FIG. 8) that is secured to the upper wall of the member 54 by a plurality of electrically conductive supporting brackets 76. The heating elements 70 and 72 are mounted adjacent the lower surface of the plate 74 by a plurality of electrically conductive brackets 78 which are secured to the plate 74 by a plurality of fasteners 80. The brackets 78 are disposed less than a quarter wavelength apart along the length of the heating elements 70 and 72 so as to break up the effective electrical length of the elements 70 and 72 to segments less than a quarter wavelength. In this manner, the absorption of incident energy from the oscillator 60 by the electrical heating elements 70 and 72 is avoided.

When the heating apparatus 30 is to be used for electric heating only, as in a baking or broiling operation, it is desirable to provide means for supporting the pan at various levels relative to the lower heating means 64 and the upper electrical heating means 70 and 72. This supporting means is provided by a removable rack 82 (FIG. 3) that can be inserted and removed relative to the cavity 55 through the oven door 34. Two supporting brackets indicated generally as 84 are removably mounted within the cavity 55 to provide means for adjustably receiving the rack 82 at different positions. The brackets 84 comprise a pair of side elements 86 and 88 to which the opposite ends of a plurality of generally U-shaped rods 90 are secured. The side elements 86 and 88 include a plurality of cam shaped and enlarged notches or slots 92 in which are slidably received pins or fasteners (not shown) carried on the two side walls of the member 54. Whenever electrical heating operations are to be carried out in the oven construction 30, the supporting brackets 84 are mounted on the opposite side walls of the member 54, and the rack 82 is inserted to rest on one pair of the supporting rods 90. However, when the oven construction 30 is to be used for radio frequency heating or cooking operations, there is a possibility that the rack 82 as well as the bracket assemblies 84 will serve as a load and remove energy from the resonant cavity 55 that should be applied to the article to be cooked. Accordingly, when the radio frequency operations are to be performed, the rack 82 is removed from the oven cavity 55 and the two supporting bracket assemblies 84 are also removed by virtue of the detachable connections afforded by the slots or grooves 92 in the side elements 86 and 88.

Since the supporting bracket assemblies 84 are disposed closely adjacent the two side walls of the resonant cavity of the member 54 defining the resonant cavity 55, it is not necessary to provide a detachable connection for these assemblies to permit them to be removed from the cavity 55. This is true because the effective fields within the cavity 55 are generally centered within the cavity and are so oriented that the conductive material forming the rods 90 extends substantially parallel to and does not intercept the fields. Therefore, the assemblies 84 can remain within the cavity 55 during radio frequency heating operations without substantially affecting the energy imparted to the load.

The oven door 34 (FIGS. 1, 3, and 9) performs the usual function of providing access to the oven cavity 55 and of providing heat insulation between the interior of the cavity 55 and the exterior of the cooking apparatus 30. However, the door construction 34 must provide the additional function of preventing the radiation of any of the radio frequency field from the interior of the oven cavity to the surrounding area while permitting the interior of the oven cavity 55 to be visually inspected from the exterior of the heating apparatus 30. To accomplish this, the door construction 34 includes a visual inspection opening indicated generally as 94 (FIGS. 1 and 9) through which the contents of the oven can be seen.

The door construction 34, which is pivotally mounted on the supporting frame 32 at its left-hand end (FIG. 1) by suitable hinge or pivot means (not shown) provides means for opening and closing an access opening 96 (FIGS. 7 and 9) to the oven cavity 55 defined by an outwardly flanged portion **54*a* extending around the sides and upper portion of the member 54 and a lower wall portion 54*b* (FIGS. 3 and 9) having an inwardly turned flange 54*c*. A frame member 98 formed of electrically conductive material and having an outwardly projecting rib 98*a* is secured in an abutting relation to the flange portion 54*a* and the lower wall portion 54*b* surrounding the access opening 96. In the closed condition of the door 34 in which it is retained by the latch 36, the inner surfaces of the door 34 seal against the frame 98 and include means in an interfitting relation with the continuous rib 98*a* thereon to provide a seal for radio frequency signals. The latch 36 or the latch 36 and the door 34 may also control one or a pair of conventional interlock means that disable the radio frequency energy source when the door is opened. For example, the interlocks can include switching means for removing the operating potential from the oscillator 60 when the door 34** is opened.

The construction of the door 34 includes a rectangular door casting 100 (FIG. 9) for supporting a pair of glass panes 102 and 104 in a spaced relation with a body of air disposed therebetween to provide insulation between the interior of the oven and the exterior of the heating apparatus 30. The outer edge of the outer glass pane 104 is received within a gasket 106 and rests on a shelf **100*a* on the main door casting 100. A metal clip 108 secured to the outer wall of the casting 100*a* by a plurality of screws 110 secures the outer glass pane 104 in position on the ledge or shelf 100*a*. The outer edge of the inner glass pane 102 similarly is received within a generally U-shaped resilient gasket 111 and rests on an upper surface of a seal casting 112 that is secured to the door casting 100 by a plurality of screws 114**.

To provide a radio frequency shield or screen for the area occupied by the glass panes 102 and 104, a metal shield 116 is provided which includes the opening 94 (FIGS. 1 and 9) through which the interior of the oven cavity 55 can be inspected. To prevent the transmission or radiation of radio frequency energy through the opening 94, this opening is closed by a section of brass screen 118 which is brazed or welded to the edges of the metal shield 116 immediately adjacent the opening 94. The screen 118 can be formed of any conductive material, such as brass, and has a mesh that is related to the frequency of the radio frequency signal supplied to the resonant cavity 55. In the illustrative example in which 285 megacycle signals are supplied to the cavity 55, the screen 118 can have a mesh of 150. The screen is shown in elevation in an exaggerated form in FIG. 1.

To secure the metal shield 116 and the screen 118 in a position completely sealing the area occupied by the panes of glass 102 and 104, the edge of the shield 116 is formed with offset portions which are interposed between the seal casting 112 and the main door casting 100 to be clamped in position therebetween by tightening the screws 114. In this manner, the metal shield 116 also aids in securing the inner glass pane 102 in position on the seal casting 112 and against an upwardly extending leg **112*a* thereof. Thus, the electrically conductive door casting 100, the seal casting 112, the metal shield 116, and the screen 118 provide an electrically conductive surface completely closing the front opening 96 to the oven cavity 55 to prevent spurious radiation to the exterior of the heating apparatus 30. Further, although the door construction 34 provides electrically conductive surfaces completely closing the front opening 96, the mesh of the screen 118 closing the opening 94 in the metal shield 116** is such as to permit the visual inspection of the interior of the cavity.

Although the door construction provides electrically conductive surfaces completely closing the front opening 96, this construction is not effective to prevent radiation from the cavity 55 unless these electrically conductive structures are placed in intimate electrical contact with the cavity defining member 54. This intimate electrical interconnection is provided by a plurality of resilient electrically conductive spring fingers 120 including an inclined leg **120*a* and a straight leg 120*b*. A plurality of the spring fingers 120 are disposed in a channel or opening 122 in the seal casting 112 which extends completely around the inner wall of the door construction 34. The spring fingers 120 are disposed in pairs opposite each other with the legs 120*b* biased into engagement with the walls of the opening 122 by a resilient generally U-shaped spring finger retainer 124. In this position, the inclined ends 120a of the spring fingers 120 are positioned opposite and extending inwardly toward each other. When the door construction 34 is closed and retained in a closed position by the latch means 36, the electrically conductive rib 98a extending completely around the opening 96 enters the matching opening 122 on the seal casting 112 of the door 34 and biases the opposed arms 120a of the spring fingers 120 outwardly. Thus, the spring fingers 120 engage the rib 98a in closely spaced positions extending completely around the front opening 96 and electrically interconnect the electrically conductive portions of the door construction 34 with the electrically conductive walls of the member 54 along a line or path surrounding the opening 96. Thus, the cavity 55 is completely bounded by what appears to be a single electrically conductive surface so as to prevent any possibility of spurious radiation from the resonant cavity 55. The outer surfaces of the door construction 34 are covered by a trim strip 126 that is secured to the door casting 100 by a plurality of screws 128**.

The tuning or pedestal assembly 56 (FIGS. 4–6) is disposed in the lower end of the resonant cavity 55 below the ceramic bottom wall 62 to provide means for restoring the cavity 55 to an impedance characteristic corresponding to that of the oscillator 60 whenever the characteristics of this cavity are changed by the introduction of food or an article to be heated. In general, the pedestal assembly 56 comprises a reentrant portion in the cavity 55 capable of altering the physical and thus electrical characteristics of the cavity 55. The assembly 56 includes an upper electrically conductive plate 132 and a lower conductive plate 134 that is secured to a lower wall of the cavity defining member 54. A sleeve construction indicated generally as 136 is connected between the plates 132 and 134 and includes an upper collar 138 secured to the plate 132 and a lower collar 140 secured to the plate 134 connected by a plurality of integrally formed and mechanically separate resilient strips 142 electrically connected to the collars 138, 140 and the plates 132, 134. Although the resilient strips 132 are shown formed in an integral construction, these fingers can be formed as separate elements joined to the collars 138 and 140, and the sleeve or cylinder construction 136 can also comprise a flexible braided cylinder connected at its upper and lower ends to the plates 132 and 134, respectively. The assembly 56 can be adjusted from an upper position (FIGS. 5 and 6) in which the plate 132 is positioned closest to the upper wall of the cavity 55 and the sleeve 136 has a minimum diameter or cross section to a lower position shown in dot and dash outline in FIG. 6 in which the plate 132 is spaced a maximum distance from the top wall of the cavity 55 and the sleeve or cylinder construction 136 has a maximum diameter or cross section.

In general, the assembly 56 in its upper position tunes the cavity 55 to a lower frequency and, in its lower position, tunes the resonant cavity to a higher frequency. Thus, whenever the tuned condition of the cavity 55 is altered by the introduction of food or an article to be heated, the setting of the tuning or pedestal assembly 56 can be adjusted to return the resonant frequency of the cavity 55 to one corresponding to the frequency of the output signals from the oscillator 60. In heating units 30 constructed in accordance with the present invention, it has been found necessary to change the tuning of the cavity 55 over a 100 megacycle range or approximately ⅓ of the operating frequency of the oscillator 60 in order to accommodate all types of foods or articles to be heated. This is accomplished with an easily controlled and economically fabricated manner by the assembly 56 and without requiring a complicated reentrant structure for the cavity 55. The difficulty of designing an oscillator 60 capable of supplying adequate power to a load over such a wide frequency range is apparent. Further, normal reentrant structures capable of tuning a cavity over such a large range of frequencies require substantial vertical movement of structures of the type provided by the plate 132, but this range of movement cannot be tolerated in the oven construction 30 because of the requirement that this construction be no larger than a conventional oven and the further requirement that the space above the bottom wall 62 be adequate to receive rather large articles of food, such as a turkey weighing in excess of twenty pounds. In the assembly 56, the tuning range over which the assembly 56 is effective is substantially enhanced by the sleeve construction 136 in which the inwardly and outwardly directed deflection of the strips 142 provides an effect substantially approximating a solid cylinder of diameters corresponding to the minimum and maximum degrees of deflection at the outermost parts of the strips.

Figure 14:
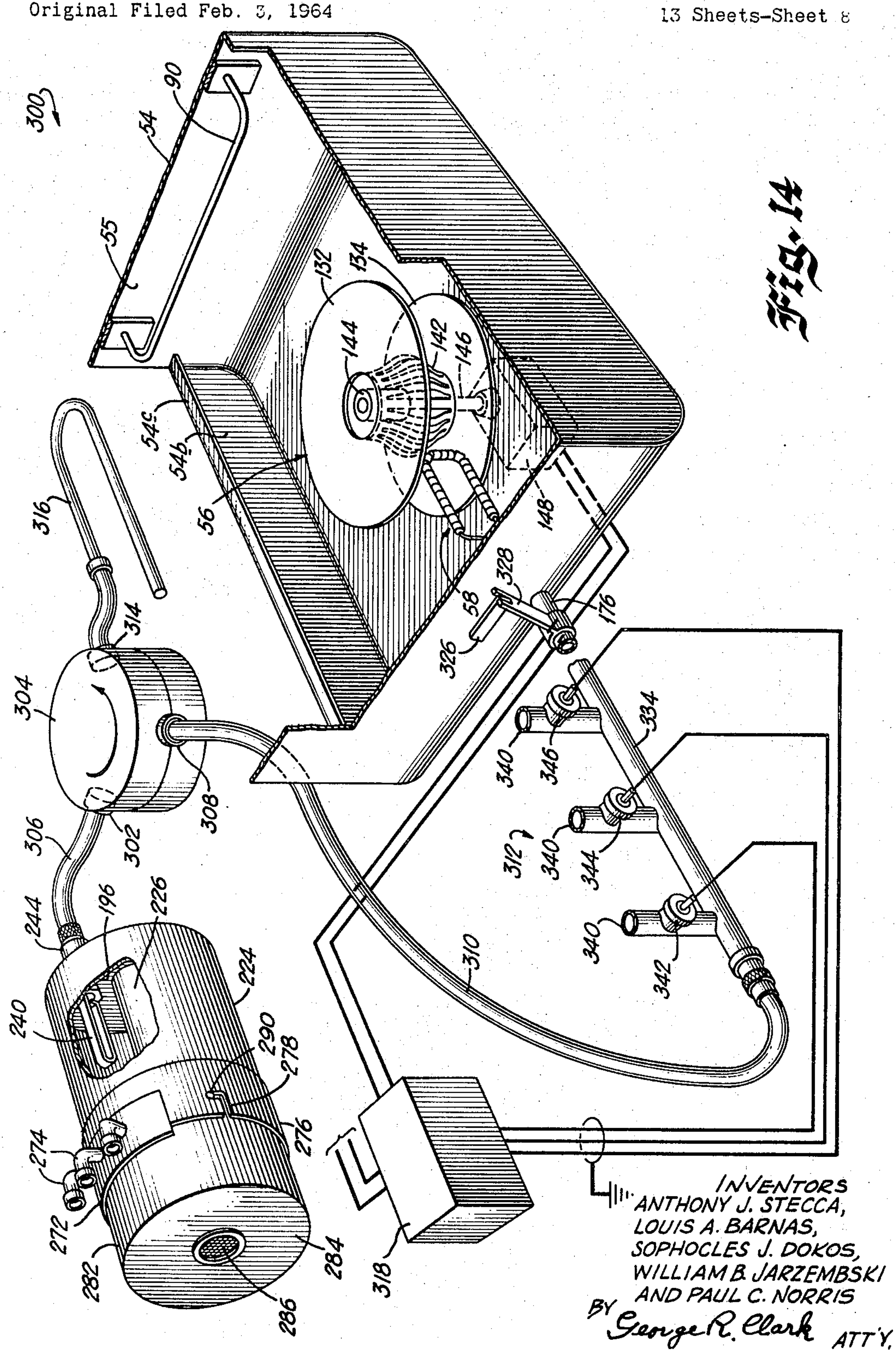
FIG. 14 is a schematic view of a first system for automatically controlling the tuning of and the coupling to the oven cavity.
Figure 15:
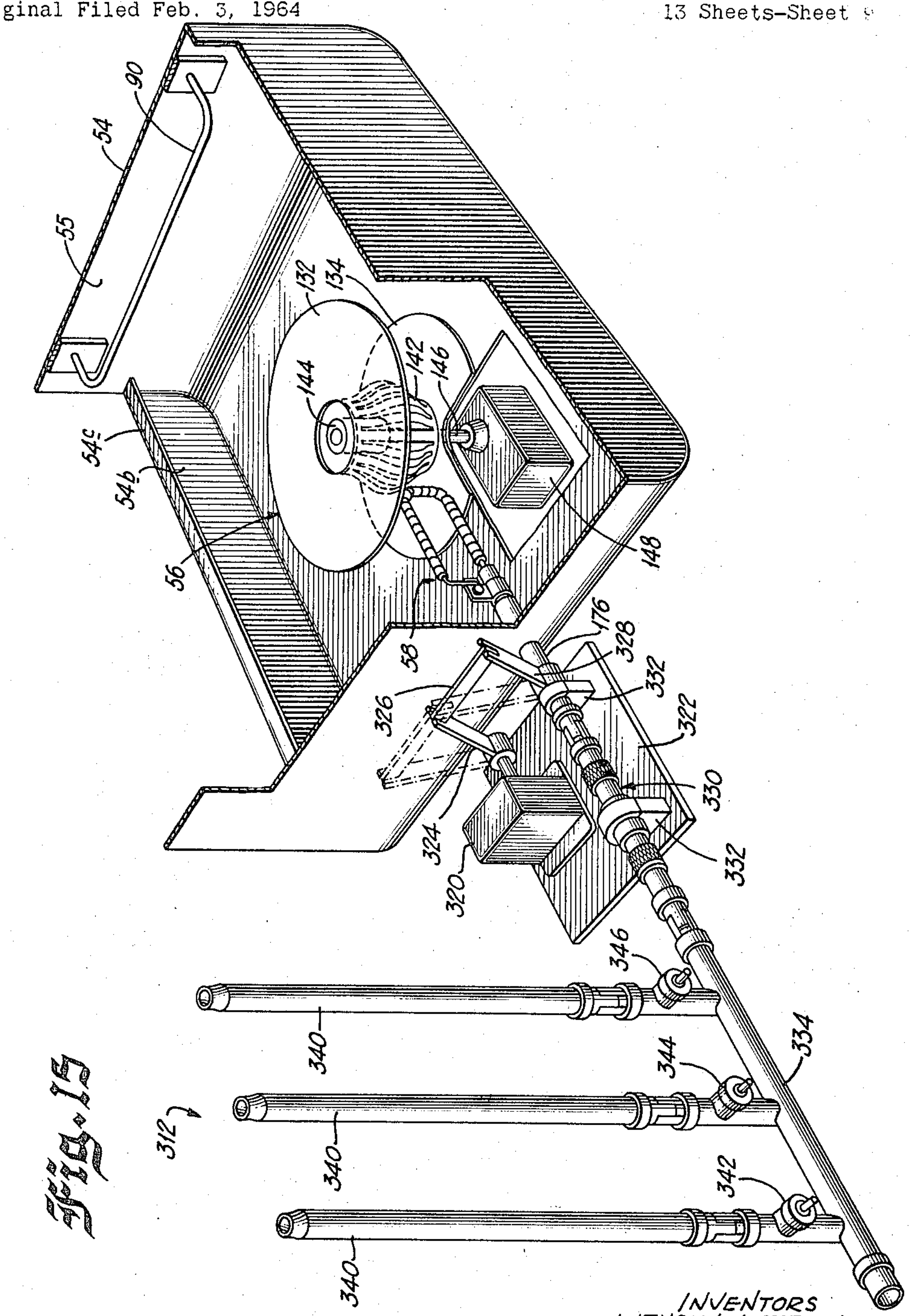
FIG. 15 is a schematic diagram similar to FIG. 14 illustrating a servomotor drive means for controlling the tuning and coupling means.
Figure 16:
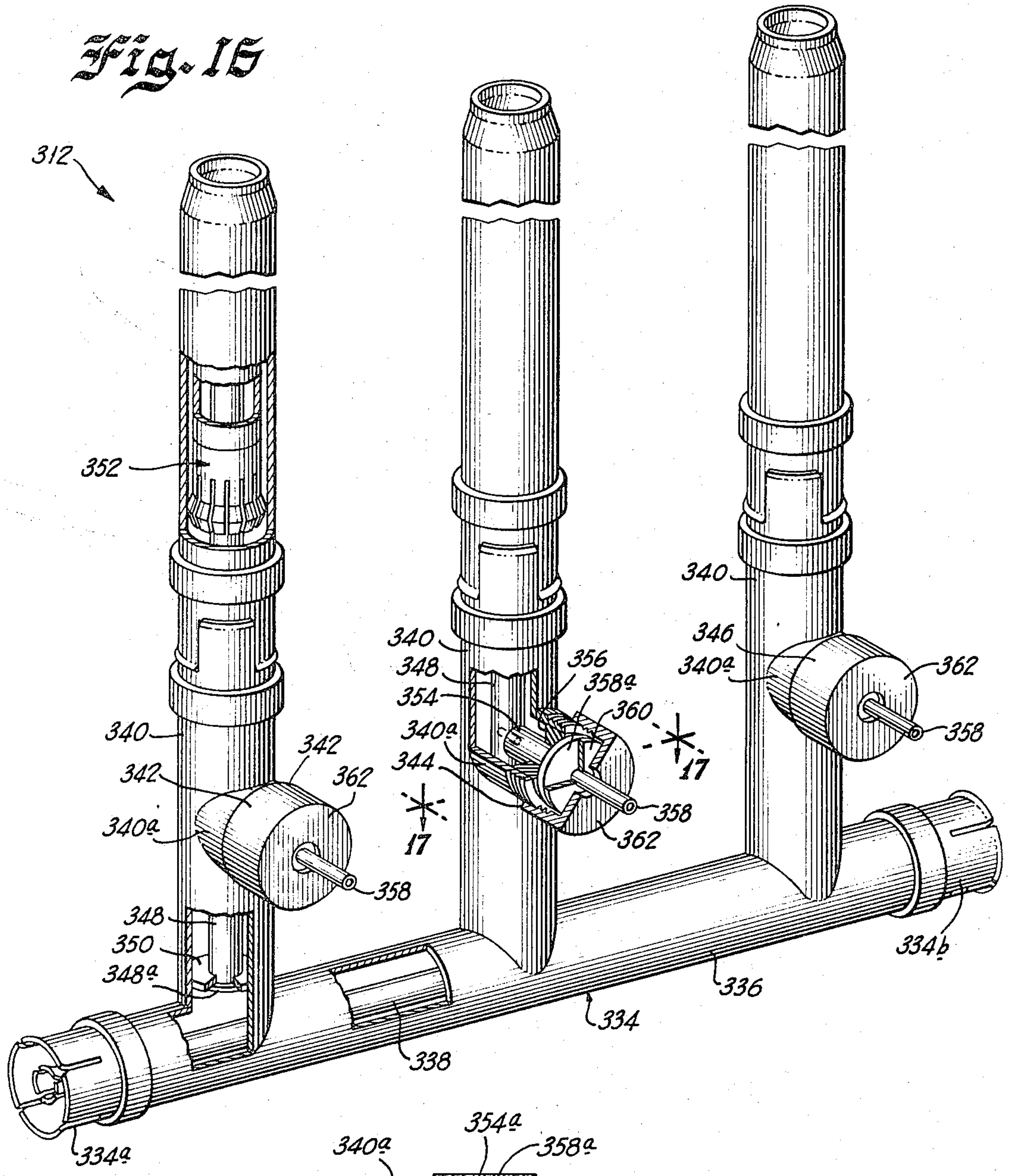
FIG. 16 is a perspective view of a diode detecting network included in the system shown in FIGS. 14 and 15.
Figure 17:
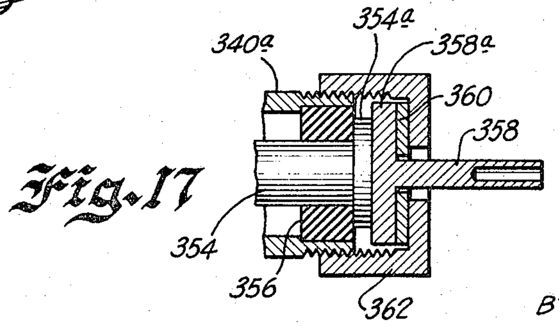
FIG. 17 is an enlarged sectional view taken along line 17–17 in FIG. 16.

The oven construction 30 can include two different drive systems for adjusting the position of the pedestal or tuning assembly 56. FIGS. 14 and 15 of the drawings illustrate a construction in which the upper plate 132 is connected to the upper end of an internally threaded sleeve 144 in which is threadedly received the upper end of a lead screw 146 connected to a bidirectional servomotor 148. The servomotor 148 is secured in a fixed position on the frame 32 for the oven construction 30. Thus, as the lead screw 146 is rotated in opposite directions, the upper plate 132 and the internally threaded sleeve 144 are moved upwardly and downwardly to adjust the position of the top plate 132 and change the diameter of the cylinder assembly 136.

Figure 4:
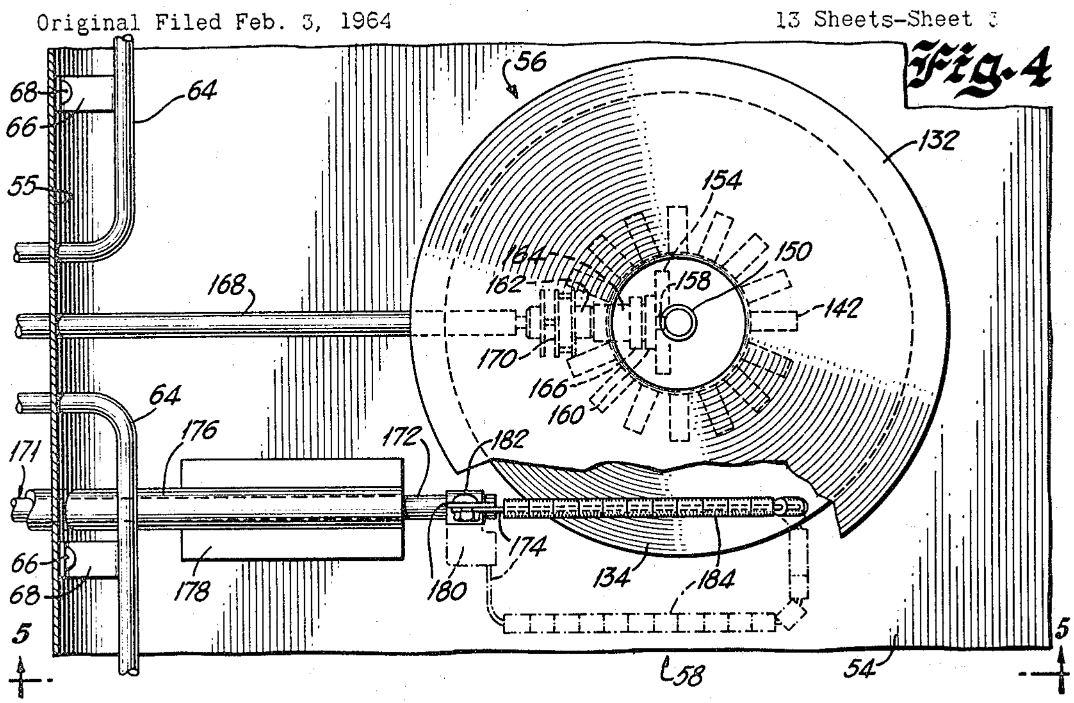
FIG. 4 is a fragmentary top elevational view of an assembly for controlling the tuning of an oven cavity and the coupling of energy to the cavity.
Figure 5:
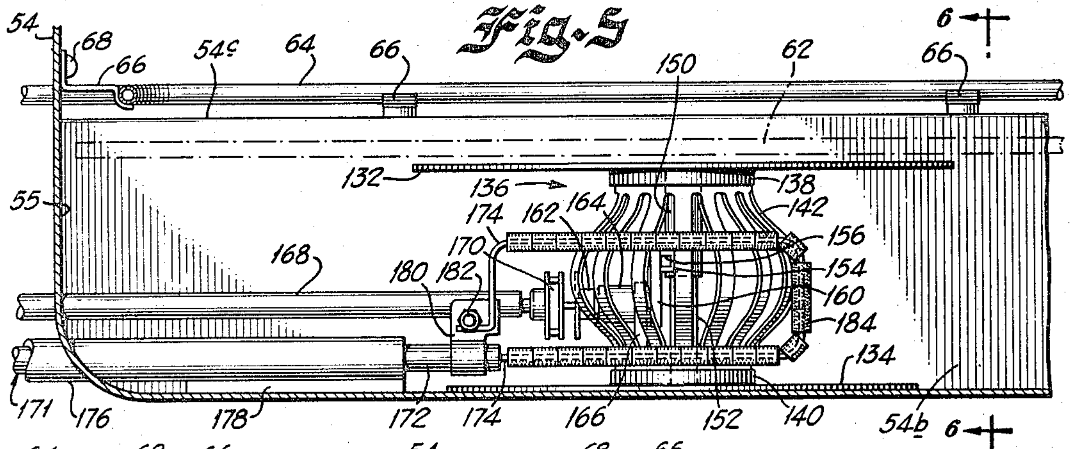
FIG. 5 is a fragmentary sectional view taken in the direction of line 5—5 in FIG. 4.
Figure 6:
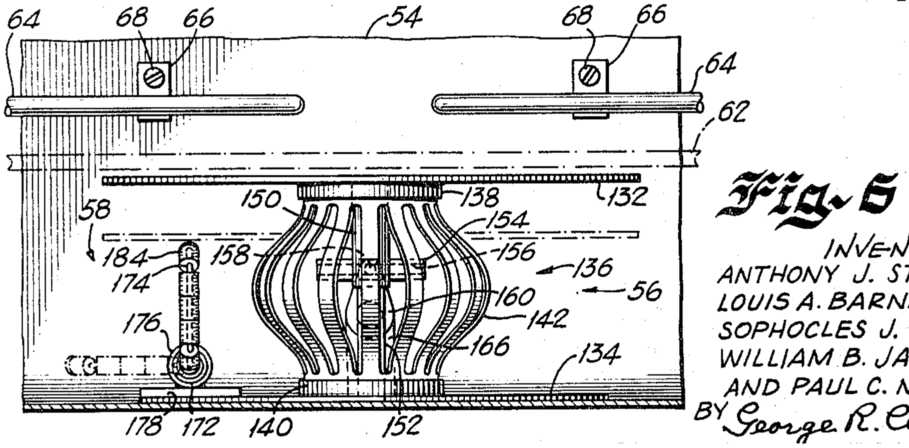
FIG. 6 is a fragmentary elevational view looking in the direction of line 6—6 in FIG. 5.
Figure 7:
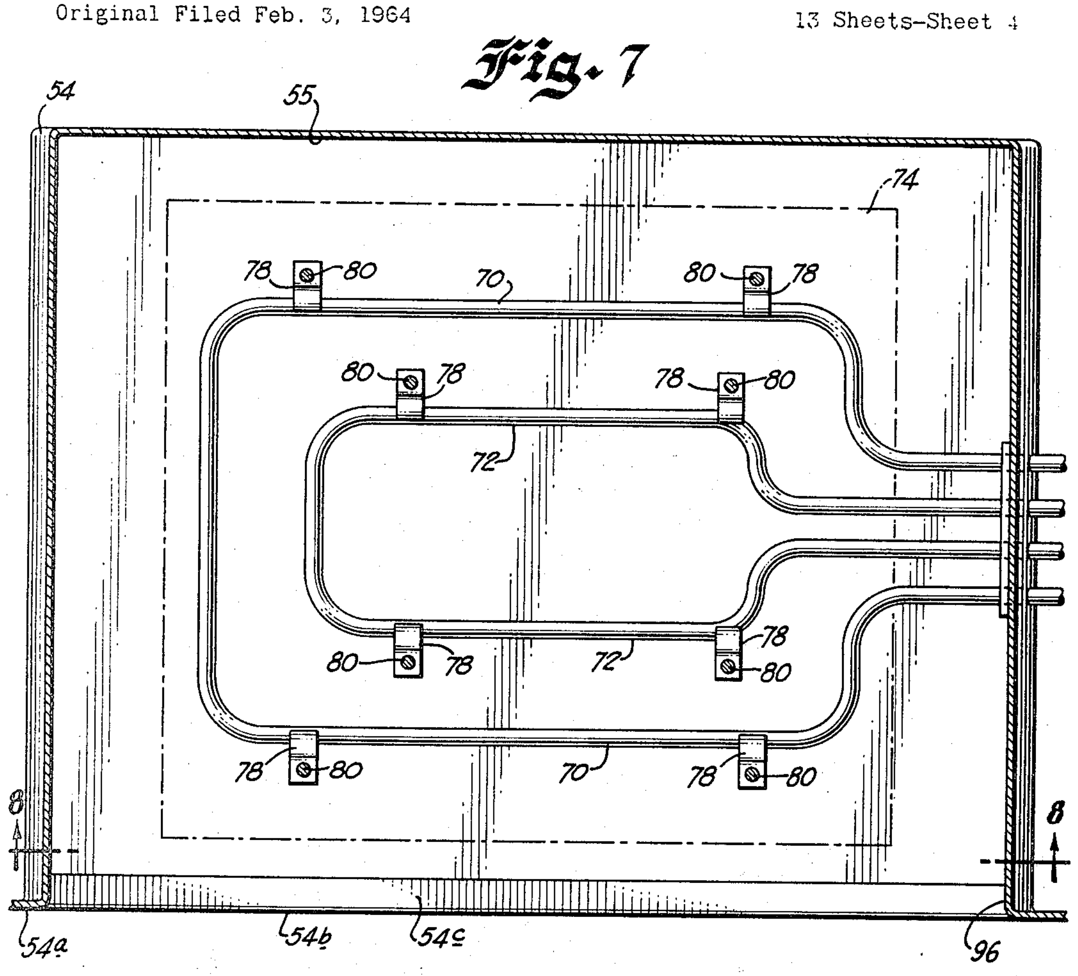
FIG. 7 is a plan view of resistance heating elements disposed in the upper end of the oven cavity.
Figure 8:
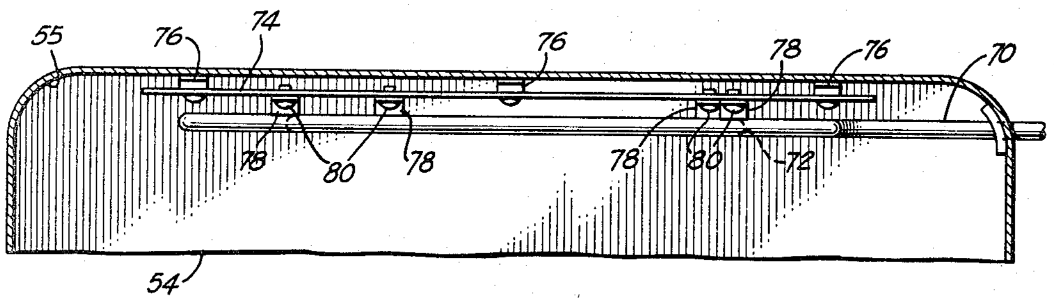
FIG. 8 is a sectional view taken along line 8—8 in FIG. 7.
Figure 9:
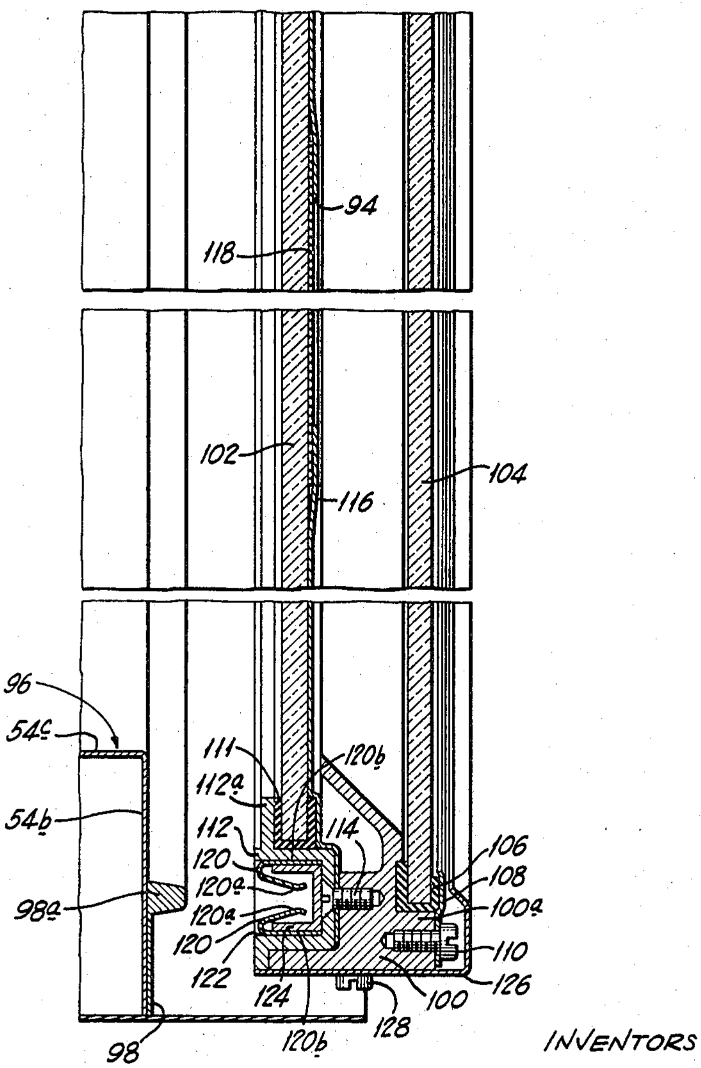
FIG. 9 is a sectional view of a door for the oven construction.

A second drive system for adjusting the position of the tuning assembly 56 is illustrated in FIGS. 4–6 of the drawings. This drive system includes a hollow cylinder or sleeve 150 which is secured to the top plate 132 and the top collar 138 at its upper end and which extends downwardly to slidably receive a shaft or post 152 whose lower end is secured to the lower plate 134. A transversely extending guide member 154 is secured to the sleeve 150 adjacent its lower end and includes a slot or keyway 156 in which is slidably mounted a pin 158 carried on the outer end of a crank or arm 160. The crank 160 is rigidly secured to one end of a shaft 162 that is rotatably mounted on the base plate 134 by a bearing 164 carried on a supporting post 166. The shaft 162 is connected to a drive shaft 168 through an adjustable coupling 170 that permits the relative angular positions of the shafts 162 and 170 to be adjusted. When the shaft 168 is rotated, the crank 160 rotates and is effective through the transverse guide member 154 to reciprocate the sleeve 150 on the post 152. The reciprocation of the sleeve 150 raises and lowers the top plate 132 and also expands and contracts the sleeve assembly 136. Thus, so long as the shaft 168 is rotated, the top plate 132 is reciprocated between its upper and lower positions and the sleeve assembly 136 is expanded and contracted between its corresponding positions of minimum and maximum diameter.

Energy is coupled to the resonant cavity 55 from the oscillator 60 by means of the adjustable coupling assembly 58. This assembly includes a coaxial cable indicated generally as 171 having an outer conductor or sheath 172 and an electrically conductive inner conductor 174. The coaxial conductor 171 enters the resonant cavity 55 through a bushing or bearing structure 176 carried on a plate 178 secured to the lower wall of the cavity defining member 54. The inner conductor 174 of the coaxial cable 171 is formed into a generally rectangular loop disposed immediately adjacent the sleeve assembly 136 of the tuning assembly 56. The outer end of the inner conductor 174 is mechanically and electrically connected to the outer conductor 172 of the coaxial cable 171 by a bracket 180 and a screw 182. A plurality of ceramic insulators or beads 184 are disposed on the conductor 174 to avoid inadvertent electrical connection between the conductor 174 and the walls of the resonant cavity 55 of the tuning assembly 56.

The pivotal mounting for the conductive loop of the coupling assembly 58 is such that this loop can be moved through 100° or more from the position illustrated in dashed outline in FIGS. 4 and 6 in which the loop lays adjacent and approximately parallel to the lower wall of the cavity 55 and an upper position in which the loop is disposed adjacent one group of the flexible strips 142 in the sleeve assembly 136. It has been found that the degree of coupling over which the cavity 55 can be tuned is substantially enhanced by so positioning the assemblies 56 and 58 that the inductive loop formed by the inner conductor 174 of the coaxial cable 171 is physically linked by one or more of the distended flexible strips 142 of the tuning assembly 56. The inductive loop formed by the inner conductor 174 provides a minimum coupling to the resonant cavity 55 in the position shown in dashed outline in FIG. 6 in which it is disposed substantially parallel to the lower wall of the member 54. This loop provides maximum coupling to the cavity 55 when this loop is in the vertical position shown in solid line in FIG. 6. In heating units 30 constructed in accordance with the present invention, it has been determined that with the mutual adjustment of the tuning assembly 56 and the coupling assembly 58, the adjustments of the assembly 56 primarily affect the reactive components of the impedance of the cavity 55 and that the adjustments of the coupling assembly 58 primarily affect the resistive components of the cavity impedance.

The inductive loop formed by the conductor 174 can also be disposed in the manner shown in FIG. 14 in which it is not in a position to be linked by the strips 142 of the tuning assembly 56. This arrangement is useful in applications requiring a smaller degree of coupling. In applications requiring greater coupling, the area enclosed by the inductive loop is increased, and this area can be selectively increased by using such expedients as a shorting turn adjustable along the lengths of a pair of parallel conductors or a loop formed by adjustable telescoping tubes. In the illustrated oven construction 30, the area of the inductive loop is made relatively small to facilitate matching light cooking loads of relatively sharp Q characteristics within the response time of the servo system.

The oscillator 60 for supplying radio frequency energy to the resonant cavity 55 is illustrated in FIGS. 10–13 of the drawings. As set forth above, the oscillator 60 provides a fixed frequency signal to the cavity 55 which, in a preferred embodiment, has a frequency of around 285 megacycles. In general, the oscillator 60 comprises a coaxial tetrode oscillator that is completely enclosed by electrically conductive surfaces to prevent spurious radiation of the radio frequency signals. The oscillator 60 in one embodiment of the heating apparatus 30 constructed in accordance with the present invention is capable of delivering 400 watts of radio frequency energy at 285 megacycles to a 50-ohm nonreactive load. The oscillator 60 has a high value of Q and is stable to within plus or minus one megacycle.

A schematic circuit diagram of the oscillator 60 using lumped parameters is illustrated in FIG. 10 of the drawings. The oscillator 60 includes a pentode tube 190, such as a 4CX250B or an RCA 8072, to the plate or anode of which is coupled a plate load or tank circuit which is illustrated by the use of lumped parameters as comprising an inductance 192 and a capacitor 194. In its physical embodiment, the plate load represented by the components 192 and 194 comprises a tuned chamber or cavity 196 from which an output signal is derived by an inductive loop shown as a coupled inductance 198 in FIG. 10. The tuned grid circuit of the tube 190, which is illustrated in lumped parameters as an inductance 200 and a capacitance 202, is coupled to the tank circuit by a probe 204. The probe 204 is disposed in the tuned chamber 196 and is coupled to the grid of the tube 190 through a grid tuned circuit comprising a pair of shorted parallel lines. The screen grid of the tube 190 is provided with a negative operating potential of around 1700 volts from a terminal 206 which is coupled to the screen grid terminal of the tube 190 through a feed-through capacitor 208. The screen grid of the tube 190 is also bypassed by a capacitor 210. The control grid of the tube 190 is provided with a grid resistor 212 supplied with a negative potential of around 2000 volts from a terminal 214, this connection passing through a feed-through capacitor 216. This terminal and an additional terminal 218 connected through a capacitor 220 supply filament voltage to the tube 190. The capacitors 208, 216, and 220 include inductive components and provide a radio frequency filter. The cathode of the tube 190 is bypassed to ground through a capacitor 222.

The physical construction of the oscillator 60 is illustrated in FIGS. 11–13 and 22 of the drawings. The plate cavity 196 is formed by an outer cylinder 224 of electrically conductive material in which is disposed an inner cylinder 226 of electrically conductive material terminating in a somewhat funnel-shaped inner end including a cylindrical portion **226*a* (FIG. 12) of greater diameter than the cylinder 226 and an outwardly flared ceramic member or portion 226*b*. The outer wall of the inner cylinder 226 is connected to the end of the cylinder 224 by electrically conductive shorting or end wall 228 to close one end of the cavity 196. The other end of the cavity 196 is closed by a shorting wall in a deck assembly indicated generally as 230 on which the tube 190 is centrally mounted by an apertured plate 232. The upper part of the tube 190 is disposed within the flared member 226*b* of the inner cylinder 226 with the anode structure of this tube slidably received within the cylindrical portion 226*a* of the cylinder 226. This anode structure includes an outer cylindrical member 234 connected to the body of the tube 190 by a plurality of cooling vanes 236. In this manner, air or other cooling media entering at the open end of the cylinder 226 pass through this cylinder and the spaces defined by the cooling vanes 236 to flow through the flared portion 226*b* around the outer surface of the tube 190 to be discharged through the openings in the apertured plate 232. A shoulder 226*c* (FIG. 12) at the lower end of the outwardly flared portion 226*b* seats on an annular rib (not shown) on the plate 232 to provide a confined path for the flow of cooling air around the outer surfaces of the tube 190**.

The output from the oscillator 60 is derived by the inductive coupling to the cavity 196 shown as 198 in FIG. 10. More specifically, an electrically conductive loop 240 (FIG. 11) is electrically connected at one end to an outer conductor 242 of a connector 244 which is secured to the wall 196 by a nut or other fastening means 246. The other leg of the inductive loop 240 is connected to an inner conductor 248 of the connector 244. The angular adjustment of the inductive coupling loop 240 relative to the tuned cavity 196 can be adjusted by loosening the nut 246, but this setting remains fixed following adjustment in the factory.

To provide means for coupling the tank circuit provided by the cavity 196 to the control grid of the tube 190, the electrically conductive probe 204 (FIG. 13) is disposed in the cavity 196 extending generally in a direction parallel to the axis of this cavity. The magnitude of the feedback signal can be controlled by varying the size and the posi.ion of the probe 204. The probe 204 includes an offset end portion **204*a* that is clamped against a dielectric bushing 252 by a nut 254 carried on one end of a threaded shaft 256. The bushing 252 and the threaded shaft 256 pass through the deck structure 230 to a position disposed outside of the cavity 196. A somewhat U-shaped length of wire 258 is secured to the outer end of the threaded shaft by a nut 260 (FIGS. 11 and 13) in such a manner that the generally U-shaped wire 258 lies parallel to and spaced from a somewhat similar U-shaped conductor 262 that is connected to a control grid terminal 264 of a tube socket by a pair of nuts 266 and 268. A shorting turn 270 extends between the wires 262 and 258 and is adjusted along the parallel arms thereof to adjust the frequency of the grid circuit by effectively varying the valves of the inductance 200 and the capacitance 202** shown in FIG. 10.

The deck structure 230 also provides a novel arrangement of and construction for the capacitors 210 and 222 (FIG. 10). The screen capacitor 210 is provided by a generally cylindrical or toroidal element secured at its lower end to the apertured plate 232 and having an inwardly extending upper end carrying a plurality of spring fingers 261 (FIG. 22) that bear against an annular screen grid terminal carried on the tube 190. The center of the circular plate 232 has an opening in which a socket 263 is mounted resting on a flange or lip 232*a* on this plate. The lugs of the socket 263 to which the cathode of the tube 190 are connected are soldered or secured to the plate 232 which is also connected to an electrically conductive housing of the capacitor 210 so that this capacitor is connected between the cathode and screen grid of the tube 190.

The capacitor 222 (FIG. 10) is formed by the plate 232 and other parts of the deck structure 230. More specifically, the circular plate 232 is disposed between a pair of centrally apertured metal plates 265 and 267 (FIG. 22) which have a slightly larger outer diameter than the plate 232. Two dielectric layers 269 and 271 composed of one or more centrally apertured sheets of dielectric material are each disposed between the plate 232 and one of the plates 265 and 267. The central plate 232, which is connected to the cathode of the tube 190, forms one plate of the capacitor 222, and the two plates 265 and 267, which are joined together and connected to ground potential, form the other plate of the capacitor 222.

To provide external electrical connections to the oscillator 60, the deck structure 230 is provided with an arcuate plate segment 272 that is rigidly connected to the plate 265. The plate 272 supports three generally L-shaped tubing elements or funnels 274 in which are disposed the filter capacitors 208, 216, and 220 and through which the screen grid, control grid, and filament potentials are supplied from the terminals 206, 214, and 218 (FIG. 10). The resistor 212 is connected between the control grid terminal 264 and the terminal provided by one of the elements 274.

To provide means for detachably mounting the components of the oscillator 60 in a completely shielded and enclosed housing, the outer cylinder 224 of the oscillator tank circuit is provided at its inner end with a cylindrical sleeve 276 having a pair of L-shaped grooves 278 and a recessed portion 280 formed therein. When the oscillator 60 is assembled, the deck structure 230 together with the components carried thereon is inserted into the sleeve 276 so that the structure of the tube 190 is disposed within the lower end of the inner cylinder 226 (FIG. 11) and so that the arcuate plate 272 is disposed in and closes the recess 280 in the sleeve 276. To complete the enclosure of the lower portion of the oscillator 60 and provide a continuation of the path for the cooling fluid or air passing by the tube 190, an additional cylindrical member 282 is provided having its outer end closed by an end wall 284 (FIG. 11) in which is formed a port covered by an electrically conductive screen 286. The cylinder 282 is open at its other end and includes a recessed portion 288 for accommodating the inner ends of the tubular elements 274. Two pins 290 disposed opposite each other on the inner end of the cylinder 282 are inserted into the open ends of the L-shaped slots 278 in the sleeve 276 when the cylinder 282 is advanced into a nesting relation with the sleeve 276. The cylinders 224 and 282 are then turned to place the pins 290 in the transversely extending portions of the slots 278 so as to lock the cylinder 224, the deck structure 230 with the components carried thereon, and the cylinder 282 in an assembled relation. The oscillator 60 can be easily disassembled to facilitate maintenance or replacement of parts in the same manner. The housing element 282 completes the radio frequency shielding of the entire oscillator unit 60 and also provides means for discharging the cooling fluid passing by the tube 190 through the port or opening closed by the screen 286.

FIGS. 14–18 of the drawings illustrate one system 300 for automatically controlling the efficient transfer of a maximum amount of energy from the oscillator 60 to the resonant oven cavity 55 while insuring the presentation of a matched impedance to the oscillator 60 in those intervals in which the resonant cavity 55 is not matched to the oscillator 60. In the system 300 (FIG. 14), the energy derived from the oscillator 60 by the single turn inductive loop 240 is coupled to a first port 302 of a circulator 304 over a coaxial cable 306 that is connected to the coupling 244 of the oscillator 60. A second port 308 of the circulator 304 is connected to the coupling assembly 58 in the oven cavity 55 over a coaxial cable 310 and a detcting assembly indicated generally as 312. Whenever the heating load within the oven cavity 55 is such that this cavity is matched to the impedance of the oscillator 60, substantially the full output of the oscillator 60 is transferred through the circulator 304 and imparted to the heating load in the oven cavity 55. However, when the impedance of the cavity 55 is not matched to the output impedance of the oscillator 60 because of the introduction of or changes in the food or other articles to be heated, varying amounts of back power are developed and are reflected back over the coaxial line 310 into the circulator 304 through the second port 308. This back power is transferred through a third port 314 to be applied to a dummy or artificial load 316. In the illustrative sample in which the resistive impedance of the oscillator 60 is around 50 ohms, the dummy load 316 provides a resistive load of the same magnitude.

In addition to utilizing the circulator 304 to provide a continuously matched impedance into which the oscillator 60 works, the system 300 also includes means for automatically changing the electrical characteristics of the resonant cavity 55 so that this cavity again is matched with the oscillator 60 to permit a maximum amount of energy to be transferred to the food. This automatic tuning of the resonant oven cavity 55 is controlled by a control circuit 318 that receives control signals from the detecting network 312. The signals supplied by the detecting network 312 are combined in the control circuit 318 to provide control signals for a pair of servomotors that adjust the position of the coupling assembly 58 and the position of the pedestal or tuning assembly 56. When the cavity 55 has been matched to the oscillator 60 under the control of the circuit 318, power is no longer dissipated in the dummy load 316, and substantially the full power output of the oscillator 60 is applied to the heating load in the cavity 55.

The setting or adjustment of the tuning assembly 56 is controlled by the selective energization of the drive motor 148 (FIGS. 14 and 15) under the control of the circuit 318 by rotating the lead screw 146 in opposite directions in the manner described above. The mechanism for adjusting the setting of the coupling assembly 58 is illustrated in FIG. 15 of the drawings. This drive assembly includes a servomotor 320 mounted on a supporting plate 322 forming a part of the main housing 32 for the heating apparatus 30. The output shaft of the servomotor 320 is connected to an arm 324 that is pivotally connected by a link 326 to an arm 328 secured to the coaxial cable 171 connected to the inductive loop of the coupling assembly 58, which coaxial cable is pivotally mounted within the sleeve or bearing 176. The coaxial cable 171 is coupled to the detecting network 312 through a series of couplings indicated generally as 330 including slip or rotatable connections to permit the coaxial cable 171 to be pivoted relative to the detecting network 312. These coupling means are pivotally mounted on the base plate or support 322 by a pair of bearings or standards 332.

In operation, the motor 320 is selectively supplied with potentials for rotating the output shaft and the arm 324 connected thereto in opposite directions from one extreme position illustrated in solid lines in FIG. 15 to an alternate extreme position illustrated in dot-and-dash outline. This pivotal movement of the arm 324 is effective through the link 326 and the arm 328 to produce a corresponding pivotal movement of the coupling assembly 58 within the resonant cavity 55. Thus, the coupling assembly 58 can be selctively adjusted to any setting between its minimum coupling position extending generally parallel to the bottom wall of the oven member 54 and its maximum coupling position in which it is disposed adjacent and even coupled with the flexible strips 142 on the pedestal assembly 56.

As indicated above, the control circuit 318 selectively supplies energizing signals to the controlling servomotors 148 and 320 under the control of the signals received from the detecting network 312. This detecting network (FIGS. 16 and 17) includes a section of coaxial connector indicated generally as 334 having an outer conductor 336 and an inner conductor 338. One end 334*a* of the coaxial connector 334 is connected to the coaxial cable 310, and the other end 334*b* thereof is coupled to the connector or coupling means 330 forming a part of the drive assembly for adjusting the position of the coupling assembly 58. Three spaced and equally transversely extending probes or coaxial lines spaced an eighth wavelength apart are coupled to the coaxial line 334 to provide means for coupling three square-law detectors 342, 344, and 346 to the line 334. The probe for the detector 344 is spaced a half wavelength from a reference point in the cavity in proximity to the inductive loop formed by the conductor 174. Each of the lines includes both an outer conductor and an inner conductor 348 which is spaced from the wall of the outer conductor by a spacing insulator 350 and which has a flattened or enlarged lower end 348*a* for capacitively coupling the inner conductor 348 to the inner conductor 338 of the connector 334. Each of the lines 340 is terminated at a point substantially one quarter of a wavelength above the square-law detectors 342, 344, and 346 by an adjustable termination or shorting means indicated generally as 352. These terminations can be adjusted to control the magnitude of the output signal derived from the detectors 342, 344, and 346.

Each of the square-law detectors 342, 344, and 346 includes a detector crystal 354 having a reduced diameter end portion that is inserted in an aligned opening in the inner conductor 348 of the lines 340. The other end of the crystal 354 is provided with a flanged or enlarged portion 354*a* that is interposed between an insulator 356 and the enlarged head 358*a* of an electrically conductive contactor 358. The insulator 356 is seated in a recess in a tubular projection 340*a* on the outer conductor of the line 340, and the outer surface of the enlarged portion 358*a* of the contactor 358 is engaged by a dielectric element 360. A cap 362 threadedly mounted on the outer end of the projecting portion 340*a* detachably mounts the detector 342, 344, and 346 on the lines 340. The cap 362 and the enlarged portion 358*a* of the contactor 358 together with the interposed dielectric element 360 provide a radio frequency filter so that substantially only direct current signals are provided at the contactor 358. The direct current signals derived from the three square-law detectors 342, 344, and 346 are supplied to the input of the control circuit 318 and are used to control the selective energization of the servomotors 148 and 320 to tune the resonant oven cavity 55.

Figure 18:
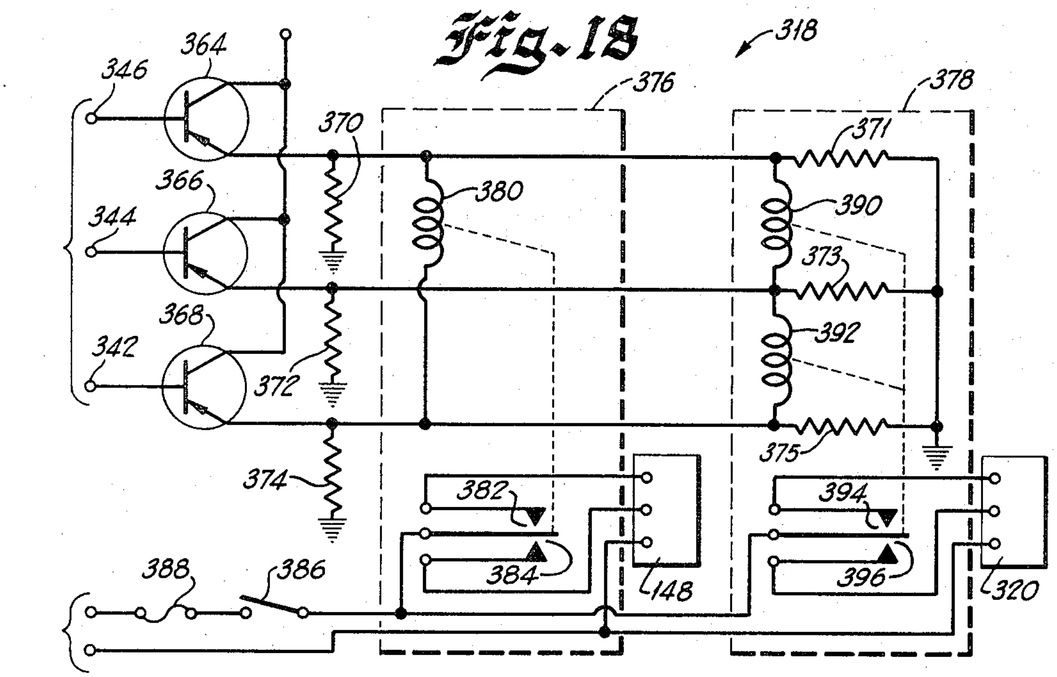
FIG. 18 is a schematic circuit diagram of the control system shown in FIGS. 14–17.

A schematic diagram of the control circuit 318 is illustrated in FIG. 18 of the drawings. This control circuit includes three transistors 364, 366, and 368 connected as emitter followers with their base electrodes connected to the outputs of the diodes 346, 344, and 342, respectively, represented by the correspondingly numbered terminals in FIG. 18. The collector electrodes of the three transistors are connected to a negative potential source having a nominal value of ten volts, and their emitter electrodes are connected to a source of reference potential such as ground through three individual pairs of resistance elements 370, 371; 372, 373; and 374, 375. The potentials from the diodes 342, 344, and 346 are effective through the transistors 368, 366, and 364, respectively, to selectively control a relay 376 that controls the operation of the drive motor 148 for the pedestal assembly 56 and a relay 378 that selectively energizes the servomotor 320 for the coupling assembly 58.

The relay 376 includes an operating winding 380 connected between emitters of the transistors 364 and 368 which controls the selective closure of two pairs of contacts 82 and 384. One side of a conventional 60-cycle, 120-volt alternating current potential source is connected to the armature of the contacts 382 and 384 through a switch 386 and a fuse 388. The other side of the potential source is connected directly to the drive motor 148. The alternate closure of the contacts 382 and 384 selectively energizes the winding means in the motor 148 to rotate the lead screw 146 in opposite directions.

The relay 378 comprises a differential relay and includes two windings 390 and 392 connected between the emitters of the transistors 364, 366, and 366, 368, respectively. The windings 390 and 392 control the selective closure of two pairs of contacts 394 and 396 which are connected to two input terminals of the motor 320. The armature of the contacts 394 and 396 is connected to one side of the potential source, and the other side of this source is connected directly to the drive motor 320.

In general, the technique used in the control circuit 318 to control the tuning of the resonant oven cavity 55 is that of adjusting the coupling assembly 58 to tune the resistive component of the cavity impedance and to adjust the pedestal assembly 56 to tune the reactive component of the cavity impedance. The energy derived by the square-law detectors 342, 344, and 346 from the reflected waves in the cavity 55 are selectively combined in the relay windings 380, 390, and 392 to control the tuning of the cavity 55. A detailed description of the theoretical considerations underlying the operation of the circuit 318 is set forth in an article entitled "Direct Reading Wave Guide Impedance and Reflection Indicator" by J. K. Chamberlain and B. Easter, appearing in Electronic Engineering for January 1962, on pages 14–20 (volume 24, No. 407).

In general, the motor 148 is controlled to adjust the reactive impedance of the cavity 55 by adjusting the tuning assembly 56 in dependence on the arithmetical difference between the potentials provided by the detectors 342 and 346. The winding 380 is directly connected across the emitters of the transistors 364 and 368. Whenever the potential supplied by the diode 342 exceeds the potential supplied by the diode 346, a voltage differential is provided across the winding 380 and indicates that the reactance of the oven cavity 55 is capacitive and that the top plate 132 of the tuning assembly 56 must be lowered to increase the resonant frequency of the cavity 55. When the winding 380 is energized in this manner, the contacts 382 are closed to energize the windings of the drive motor 148 so that the lead screw 146 is rotated in a direction to lower the top plate 132 and expand the sleeve assembly 136. This has the effect of increasing the inductance of the cavity 55 and of increasing its frequency. Whenever the potential derived by the diodes 342 and 346 are equal, the potential difference across the winding 380 disappears, and the contacts 382 are opened to terminate the energization of the motor 148 with the reactance of the cavity reduced to value approaching zero.

On the other hand, when the potential supplied by the diode 346 exceeds the potential supplied by the diode 342 so that a corresponding potential difference appears across the winding 380, the oven cavity 55 has an inductive reactance with the result that the resonant frequency of the oven cavity is higher than the fixed frequency of the oscillator 60. With this potential difference across the winding 380, this winding closes the contacts 384 to energize the motor 148 so that the lead screw 146 is rotated in a direction to raise the top plate 132 of the pedestal assembly 56 and to contract the sleeve assembly 136. This reduces the inductive reactance of the cavity 55 until the point is reached at which the value of the reactance of the cavity 55 approaches zero. At this time, equal potentials are supplied by the diodes 342 and 346, and the potential difference across the winding 380 disappears so that the contacts 384 are opened. This terminates the energization of the motor 148 with the pedestal assembly 56 in a condition in which the reactance of the cavity 55 is substantially zero and matched to the purely resistive output impedance of the oscillator 60. In this manner, the selective energization of the motor 148 to raise and lower the tuning assembly 56 serves to balance out the reactive components of the impedance of the cavity 55 so that this cavity presents a primarily resistive load.

The relay 378 is selectively controlled by the potential supplied by the transistors 364, 366, and 368 to open and close the contacts 394 and 396 so as to balance the resistive component of the impedance of the resonant oven cavity 55 with the substantially fixed resistive impedance of the oscillator 60 by varying the position of the coupling assembly 58. The connection of the windings 390 and 392 to the transistors 364, 366, and 368 is such that the potential supplied by the diode 344 is compared against one half of the sum of the potentials supplied by the diodes 342 and 346. If it is assumed that the resistive component of the impedance of the oven cavity 55 is less than the output resistance of the oscillator 60, one half of the sum of the potentials supplied by the diodes 342 and 346 is greater than the potential supplied by the diode 344. The unbalanced potentials produced across the windings 390 and 392 of the differential relay 378 causes the closure of the contacts 394 so that the drive motor 320 is energized to pivot the crank 324 (FIGS. 14 and 15) in a clockwise direction. Movement in a clockwise direction produces a corresponding movement of the single turn inductive loop in the assembly 58 so that the oscillator 60 is more closely coupled to the cavity 55 and to the tuning assembly 56. This increase in mutual coupling has the effect of increasing the apparent resistance of the cavity 55. When this resistance is matched to the 50 ohm impedance of the oscillator 60, the windings 390 and 392 are no longer differentially energized, and the contacts 394 open to terminate the energization of the motor 320.

On the other hand, when the resistance of the resonant cavity 55 is greater than the resistance of the oscillator 60, the potential supplied by the detector 344 exceeds one half of the sum of the potentials supplied by the diodes 342 and 346. The differential windings 390 and 392 are now so energized as to cause the closure of the contacts 396. When the contacts 396 are closed, the motor 320 is energized to pivot the crank or arm 324 and the single turn inductive loop of the coupling assembly 58 (FIGS. 14 and 15) in a counterclockwise direction so that this turn moves from a more vertical position to a position approaching one parallel to the lower wall of the cavity defining member 54. This reduces the mutual coupling between the oscillator 60 and the cavity 55 and has the effect of decreasing the apparent resistance of the cavity 55.

When the resistance of the oscillator 60 is matched to the resistance of the resonant oven cavity 55, energy is no longer reflected from the cavity 55 to the detecting assembly 312, and the potential supplied by the diode 344 equals one half of the sum of the potentials supplied by the diodes 342 and 346. At this time, the windings 390 and 392 of the relay 378 open the contacts 396 to terminate the energization of the motor 320. In this manner, the relay 378 in the control network 318 controls the motor 320 to balance the resistive impedances of the oscillator 60 and the oven cavity 55. Accordingly, the control circuit 318 is supplied with control potentials from the detecting network 312 to provide means for reducing the imaginary component of the impedance of the cavity 55 to an insignificant value and for balancing the real component of this impedance to the output impedance of the oscillator 60 by separately adjusting the real and imaginary impedance components of the cavity 55 in dependence on the energy reflected from this cavity.

The outputs from the detectors 342, 344, and 346 can be matched or placed in a proper relationship to each other by adjusting the terminations 352 in the probes 340 to change the distance between these terminations and the detectors 342, 344, and 346 to values slightly more or less than a quarter wavelength. This permits slight differences in the coupling characteristics and the operating characteristics of these diodes to be balanced.

Figure 21:
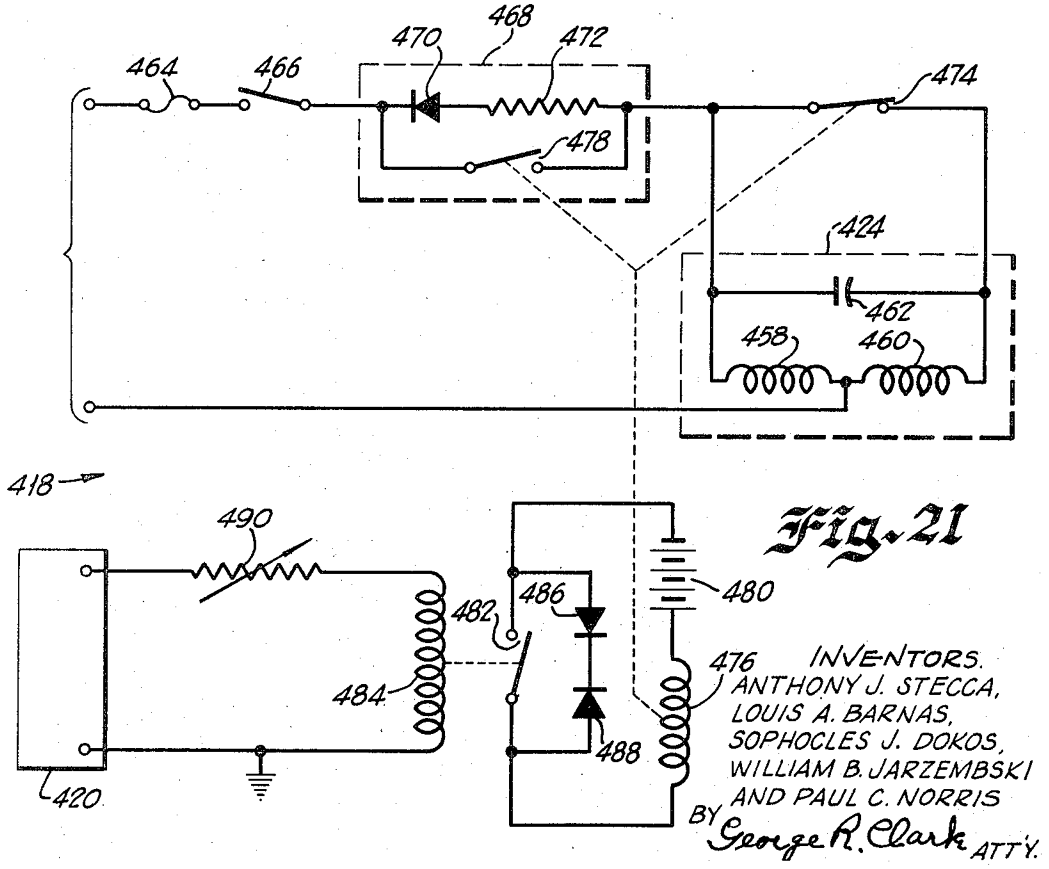
FIG. 21 is a schematic circuit diagram of the control circuit embodied in the system shown in FIGS. 19 and 20.
Figure 19:
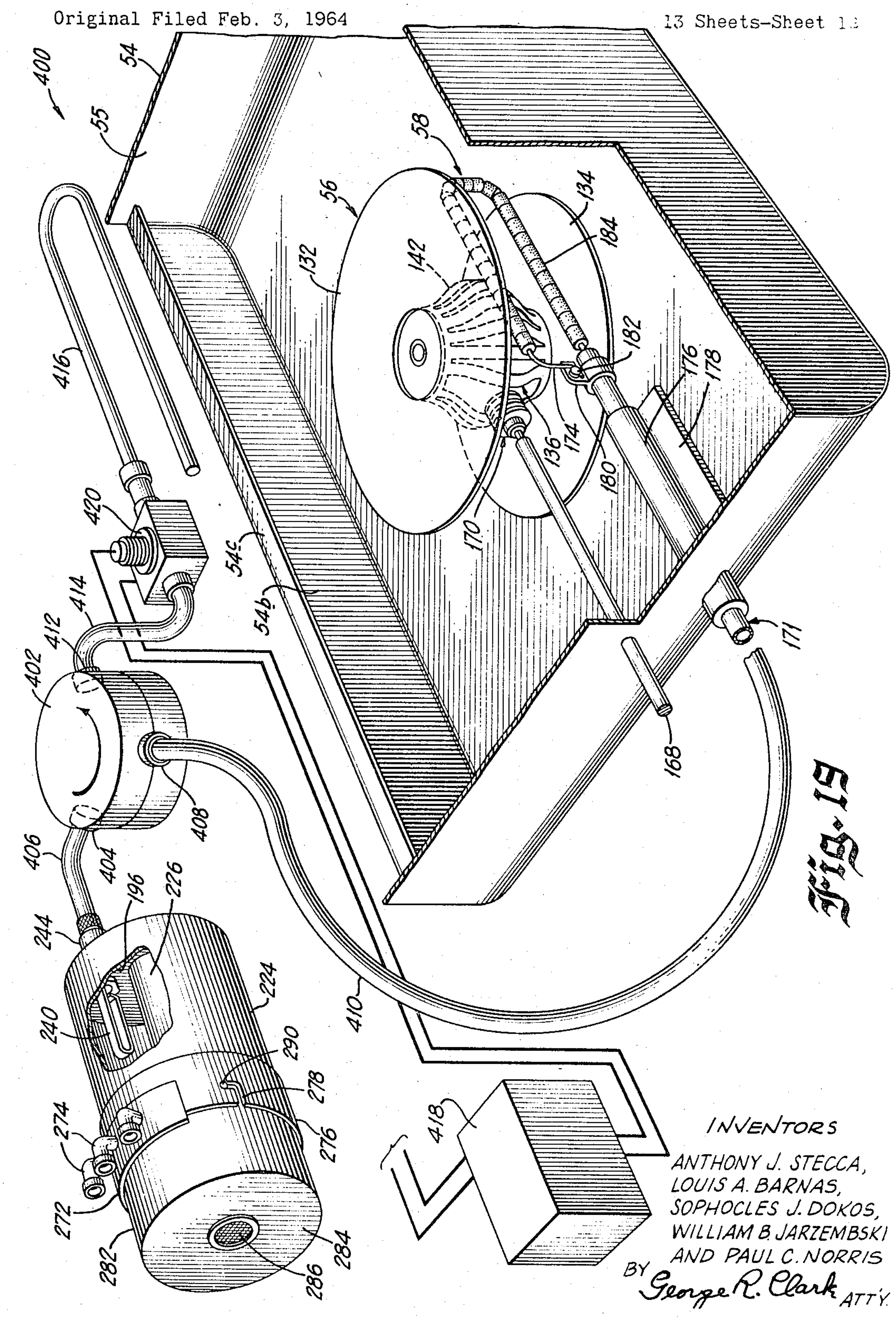
FIG. 19 is a schematic drawing of another embodiment of a system for controlling the tuning of and the coupling of energy to the oven cavity.
Figure 20:
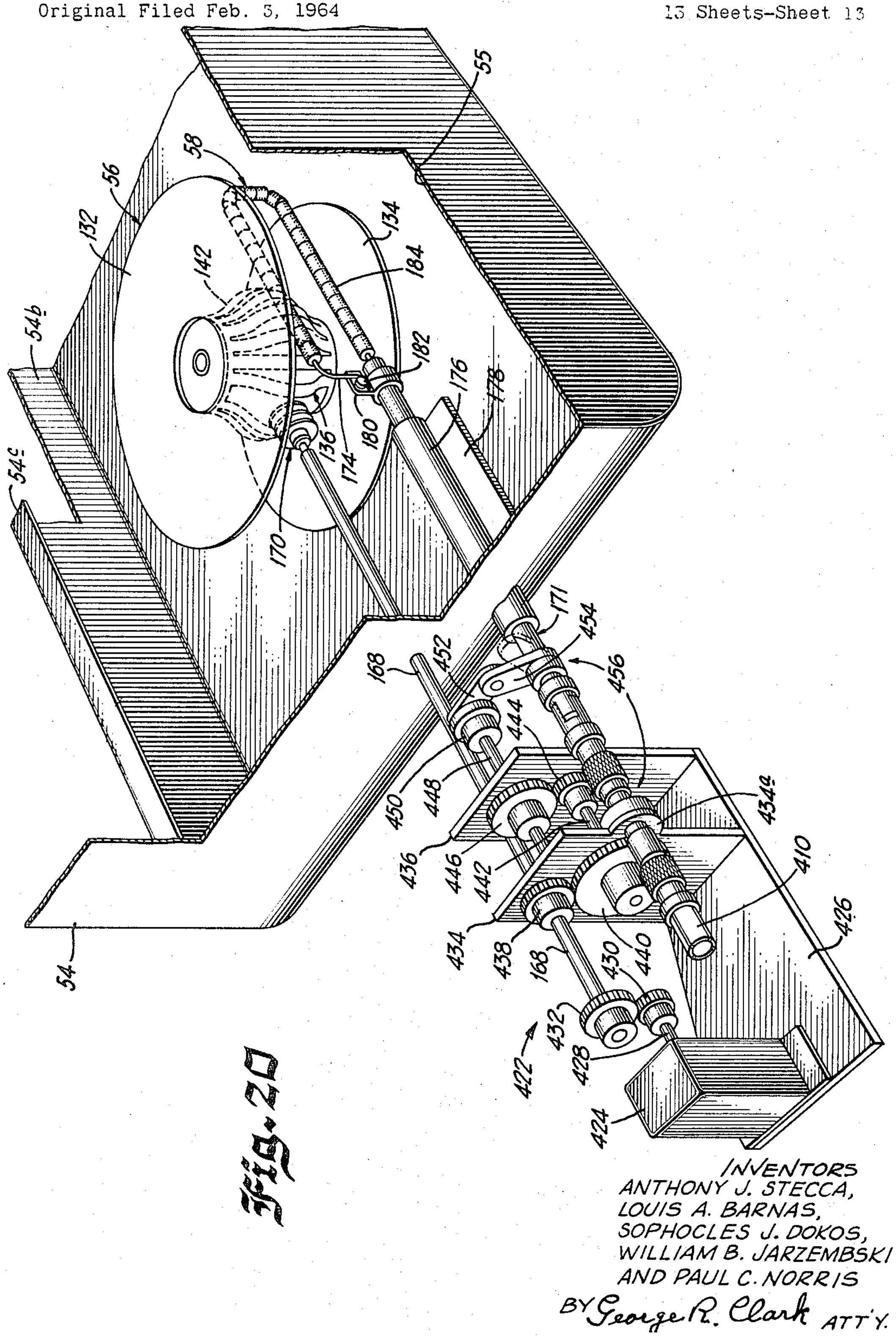
FIG. 20 is a perspective view of a drive system for the control system shown in FIG. 19.

FIGS. 19–21 of the drawings illustrate another system 400 for automatically tuning the resonant oven cavity 55 to match the oscillator 60. The system 400 requires substantially fewer control components and less control circuitry than the system 300 while providing accurately controlled means for matching the resonant oven cavity 55 to the oscillator 60. In general, the system 400 is responsive to the presence of back power from the cavity, indicating a mismatch in impedance, to continuously vary the settings of the coupling assembly 58 and the tuning assembly 56 in a random fashion until such time as the back power is reduced to a predetermined low level. At this time, the assemblies 56 and 58 are braked in their adjusted positions until such time as a change in the cavity condition requires readjustment of the cavity to match it to the oscillator 60.

The system 400 (FIG. 19) includes a circulator 402 having a first port 404 that is connected to the coupling loop 240 in the oscillator 60 by a coaxial cable 406 connected to the coupling 244. The radio frequency energy from the oscillator 60 is coupled through the circulator 402 to a second port 408 to which is connected a coaxial cable 410, the other end of which is coupled to the coaxial cable 171 connected to the coupling assembly 58. In this manner, energy from the oscillator 60 is applied to the resonant oven cavity 55 and is efficiently transferred to the heating load so long as the resonant cavity 55 remains matched to the impedance of the oscillator 60. Whenever a mismatch occurs, energy is reflected or back power is transmitted over the coaxial cable 410 to enter the circulator 402 through the second port 408. This energy is transmitted out of a third port 412 and over a coaxial cable 414 to a dummy or artificial load 416 which is of the same type as the dummy load 316 in the system 300. Thus, the dummy load 416, which is substantially resistive in character, matches the impedance of the oscillator 60 and provides means for insuring that this oscillator works into a matched impedance in even those instances in which the oven resonant cavity 55 is not tuned to the oscillator 60.

To provide means for automatically retuning the cavity 55 to the oscillator 60 when a mismatch occurs, the system 400 includes a control circuit 418 that is supplied with control signals representing the amount of back power by a detector or detecting probe 420 connected between the coaxial cable 414 and the dummy load 416. The control circuit 418 controls a drive assembly indicated generally as 422 (FIG. 20) to place this drive means in operation whenever back power exceeds a predetermined value. The drive means 422 continuously adjusts the setting of the tuning assembly 56 and the coupling assembly 58 until the back power detected by the assembly 420 falls below the predetermined level. At this time, the control circuit 418 terminates operation of the drive means 422.

The drive means 422 (FIG. 20) includes a drive motor 424 secured to a supporting plate or base 426. An output shaft 428 from the motor 424 is coupled to the shaft 168 for adjusting the position of the tuning assembly 56 through a pair of coupled pinion gears 430 and 432.

The shaft 168 is journaled in a pair of supporting plates 434 and 436 carried on the base 426. The motor 424, when energized, rotates continuously in a single direction and produces corresponding continuous rotation in a single direction of the drive shaft 168. This is effective to operate the mechanism described above so that the top plate 132 of the pedestal assembly 56 is continuously reciprocated between its extreme upper and lower positions and the cylinder assembly 136 forming a part of the tuning assembly 56 is also continuously actuated between its contracted and expanded positions.

To provide means for reciprocating the coupling assembly 58 between its extreme positions, a gear 438 secured to that shaft 168 meshes with a gear 440 secured to one end of a shaft 442 that is rotatably mounted on the plates 434 and 436. A gear 444 secured to the shaft 442 meshes with a gear 446 that is secured to a shaft 448 rotatably mounted on the plates 434 and 436. The outer end of the shaft 48 is rigidly secured to a member 450 to the outer face of which one end of a link 452 is connected by a pivot pin carried in a position disposed offset with respect to the axis of the shaft 448. The other end of the link 452 is pivotally connected to a crank 454 that is rigidly secured to the coaxial cable or connector 171. The outer end of the coaxial cable 171 is coupled to the coaxial cable 410 through a coupling assembly which is indicated generally as 456 and which includes one or more slip or rotating joints. The assembly 456 is carried on a protuberance 434*a* on the support 434.

When the output shaft 428 of the drive motor 424 is rotated continuously in a single direction, this rotation is effective through the gear train including the gears 430, 432, 438, 440, 444, and 446 to rotate the member 450. Rotation of the member 450 is effective through the eccentric connection of the link 452 and the crank 454 to pivot the crank 454, the coaxial cable 171, and the single inductive turn in the assembly 58 between its two extreme positions. The corresponding positions of the crank 454 are shown in solid and in dot-and-dash outlines in FIG. 20. Thus, operation of the motor 424 causes concurrent oscillation of the coupling assembly 58 and reciprocation of the pedestal assembly 56. The drive trains interposed between the motor 424 and the assemblies 56 and 58 are such that the relative settings or positions of the assemblies 56 and 58 are adjusted in a random fashion. In one embodiment of the heating apparatus 30 constructed in accordance with the present invention, the pedestal or tuning assembly 56 is reciprocated eight times a second while the loop in the coupling assembly 58 is pivoted between its extreme positions 2.3 times in a one minute interval. Thus, the relative positions of the tuning assembly 56 and the coupling assembly 58 are continuously varied in a pattern that is repeated at only greatly spaced intervals during the period of energization of the motor 424.

A schematic diagram of the control circuit 418 for controlling the selective energization of the motor 424 is illustrated in FIG. 21 of the drawings, which diagram illustrates the circuit 418 in a normal condition in which the motor 424 is not energized. The motor 424 includes a pair of operating windings 458 and 460 shunted by a capacitor 462 and having a common terminal connected directly to one side of a conventional 60 cycle, 120 volt alternating current potential. The other side of the potential source is connected through a fuse 464 and an on-off switch 466 to a dynamic braking control network indicated generally as 468. When the motor 424 is not energized, the dynamic braking potential is directly applied to one terminal of the winding 458 through a diode 470 and dropping resistance 472. This potential is also directly applied to one terminal of the winding 460 through a pair of normally closed contacts 474 on a control relay including an operating winding 476. A pair of normally open contacts 478 on this relay shunt the series circuit including the diode 470 and the resistance 472.

The operating winding 476 of the control relay is connected in series with a direct current potential source 480 and a pair of normally open contacts 482 on an input relay including an operating winding 484. A pair of back-to-back connected diodes 486 and 488 are shunted across the contacts 482 to provide contact protection. The operating winding 484 of the input relay is connected in series with the back power detecting diode 420 through a variable resistance element 490 that permits level of response of input relay to be adjusted.

When an article to be heated or food is disposed in the oven cavity 55 or the characteristics of food previously inserted into the cavity change so that the resonant cavity 55 is no longer matched to the oscillator 60, back power is reflected through the coaxial cable 410, the circulator 402, and the coaxial cable 414 to the dummy or artificial load 416. This back power is rectified by the detector 420 to provide a direct current potential which, when the back power exceeds a predetermined level, energizes the operating winding 484 of the input relay to close the contacts 482. This energizes the operating winding 476 of the control relay so that the contacts 478 are closed and the contacts 474 are opened. This operation of the contacts 474 and 478 removes the direct current dynamic braking potential from the windings 458 and 460 of the motor 424 and connects the winding 458 directly and the winding 460 through the capacitor 462 to the alternating current input potential. This energizes the motor 424 so that it rotates continuously in a single direction. The continuous rotation of the drive motor 424 controls the drive assembly 422 in the manner described above so that the settings of the tuning assembly 56 and the coupling assembly 58 are continuously varied relative to each other.

In the system 300, the control circuit 318, which senses the magnitude and direction of error, provides the two separate drive motors 148 and 320 for the pedestal assembly 56 and the coupling assembly 58 with independent signals indicating the direction in which these assemblies must be adjusted to correct the tuning of the resonant oven cavity 55. Quite to the contrary, the control circuit 418 in the control system 400 merely places the motor 424 in operation to continuously rotate in a single direction independently of the direction in which the assemblies 56 and 58 must be adjusted in order to retune the resonant oven cavity 55. However, because of the fact that the continuous oscillation or hunting of the tuning assembly 56 and the coupling assembly 58 occurs in random relation to each other, the settings of these two assemblies will soon approach the relationship necessary to tune the resonant oven cavity 55 to the oscillator 60. At this time, the back power supplied to the dummy load 416 drops below the predetermined value to which the relay winding 484 is set to respond, and the contacts 482 are opened to terminate the energization of the relay 476.

At this time, the contacts 474 are closed and the contacts 478 are opened. The opening of the contacts 478 removes the alternating current energization of the windings 458 and 460 in the motor 424. The closure of the contacts 474 permits the application of pulsating direct current to both of the windings 458 and 460 so that the motor 424 is dynamically braked to immediately arrest the assemblies 56 and 58 in the proper positions relative to each other in which the resonant cavity 55 is tuned to the oscillator 60. The control circuit 418 and the drive assembly 422 remain in this condition as long as the tuning of the cavity 55 does not depart from a matched condition with the oscillator 60. It has been determined that a mismatch occurring by virtue of the change in the state of the food in the oven 30 will, in many instances, be in such a direction that the reenergization of the control circuit 418 resulting therefrom will cause the drive assembly 422 to move in the direction of a corrective setting of the assemblies 56 and 58 rather than away from such a setting. Thus, the period in which the control circuit 418 is in operation after first reaching a tuned condition is shortened.

Although the present invention has been described with reference to two illustrative embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. An oscillator comprising an outer cylinder of substantially uniform diameter, an inner cylinder disposed within and generally concentric with the outer cylinder, the opposite ends of the outer cylinder being connected by conductive end walls to the outer wall of the inner cylinder, the volume enclosed by the inner and outer cylinders and the end walls providing a cavity resonant at a given frequency, a controlled conduction device disposed within one end of the inner cylinder and having an anode electrically connected to the inner cylinder, said cavity providing a tuned load for the anode of the controlled conduction device, an additional cylinder of substantially the same diameter as the outer cylinder secured to the outer cylinder adjacent one of the end walls to define a chamber communicating with the interior of the inner cylinder and containing a grid terminal for the controlled conduction device, means in said chamber coupling the grid terminal to the resonant cavity, and means in said additional cylinder forming a fluid port to permit a cooling medium to flow through the inner cylinder, past the controlled conduction device, and out of the chamber through the port.

2. The oscillator set forth in claim 1 in which the inner cylinder includes an outwardly flared end portion adjacent said one end wall and surrounding the controlled conduction device.

3. The oscillator set forth in claim 2 including an induction loop projecting into the cavity through the other end wall and extending generally parallel to but spaced from the inner cylinder.

4. A high frequency oscillator comprising a generally circular and uniplanar supporting structure, a controlled conduction device mounted on one surface of the supporting structure and including an output electrode spaced from the supporting structure and a high impedance control electrode with a terminal accessible at the opposite side of the supporting structure, tank circuit means including a pair of concentric cylinders joined at one end and open at the other end, said supporting structure being disposed in the open end of the tank circuit means with the output electrode within the inner of the concentric cylinder and with the supporting structure substantially closing the open end of the tank circuit means, coupling means connected directly to the high impedance control electrode terminal and disposed at the other side of the supporting structure, said coupling means including a signal probe passing through the supporting structure and extending into the space between the concentric cylinder of the tank circuit means, and cylindrical means closed at one end and connected to the tank circuit means to enclose the coupling means.

5. The oscillator set forth in claim 4 in which the coupling means includes a pair of spaced conductors extending generally parallel to each other, one of said conductors being connected to the terminal and the other of said conductors being connected to the signal probe, and in which the coupling means further includes tuning means for tuning said pair of spaced conductors to optimize coupling at a particular frequency.

6. The oscillator set forth in claim 4 including a sleeve in which the open end of the outer one of the concentric cylinder in the tank circuit means and the open end of the cylindrical means are inserted.

7. In an oscillator construction of the type using a tube having at least a cathode and an anode, first plate means for supporting the tube and connected to the cathode, second plate means disposed adjacent the first plate means, dielectric means interposed between the first and second plate means so that the first and second plate means and the dielectric means provide capacitive means connected to the cathode, electrically conductive cylinder means open at one end and closed at the other end, and means mounting the first and second plate means on the cylinder means with at least the anode of the tube within the cylinder to provide a tuned load for the tube and with the first and second plate means closing the open end of the cylinder, the second plate means being electrically connected to the cylinder means.

References Cited

UNITED STATES PATENTS

| | | | |
|---|---|---|---|
| 2,416,565 | 2/1947 | Beggs | 331—98 X |
| 2,747,091 | 5/1956 | Fraser | 331—98 X |
| 2,759,101 | 8/1956 | Crandell et al. | 331—70 |

OTHER REFERENCES

Gurewitsch et al., "Microwave Oscillators Using Disk-Seal Tubes," Proceedings of IRE, vol. 35, No. 5, May 1947, pp. 462–464.

ROY LAKE, *Primary Examiner.*

S. H. GRIMM, *Assistant Examiner.*